(12) United States Patent
Tanaka et al.

(10) Patent No.: US 6,897,927 B2
(45) Date of Patent: May 24, 2005

(54) COLOR LIQUID CRYSTAL DISPLAY DEVICE AND MANUFACTURING METHOD OF THE SAME

(75) Inventors: Hiroaki Tanaka, Tokyo (JP); Michiaki Sakamoto, Tokyo (JP); Takahiko Watanabe, Tokyo (JP); Yoshiaki Hashimoto, Tokyo (JP); Syuusaku Kido, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 714 days.

(21) Appl. No.: 09/867,423

(22) Filed: May 31, 2001

(65) Prior Publication Data

US 2001/0048491 A1 Dec. 6, 2001

(30) Foreign Application Priority Data

May 31, 2000 (JP) .......................................... 2000-161677
Apr. 9, 2001 (JP) .......................................... 2001-110195

(51) Int. Cl.[7] ............................................ G02F 1/1337
(52) U.S. Cl. ...................... 349/129; 349/146; 349/113
(58) Field of Search ......................... 430/313; 349/156, 349/113, 129, 146, 132

(56) References Cited

U.S. PATENT DOCUMENTS

| 6,707,520 B2 * | 3/2004 | Park et al. | 349/129 |
| 6,762,805 B2 * | 7/2004 | Ishino | 349/46 |
| 6,762,812 B2 * | 7/2004 | Hasegawa et al. | 349/132 |
| 6,767,694 B2 * | 7/2004 | Kido | 430/313 |
| 6,774,975 B2 * | 8/2004 | Ahn | 349/156 |
| 6,801,279 B2 * | 10/2004 | Jang et al. | 349/113 |

FOREIGN PATENT DOCUMENTS

| JP | 01-124824 | 5/1989 |
| JP | 04-253028 | 9/1992 |
| JP | 4-253028 | 9/1992 |
| JP | 08-334748 | 12/1996 |
| JP | 10-133012 | 5/1998 |
| JP | 11-024108 | 1/1999 |
| JP | 11-190859 | 7/1999 |
| JP | 11-258634 | 9/1999 |
| JP | 11-264995 | 9/1999 |
| JP | 2000-164886 | 6/2000 |
| JP | 2001-005038 | 1/2001 |

OTHER PUBLICATIONS

Kim, C. W. et al., "A Novel Four–Mask–Count Process architecture for TFT–LCDs", *SID 00 Digest*, pp. 1006–1009.

* cited by examiner

*Primary Examiner*—John F. Niebling
*Assistant Examiner*—Andre' C. Stevenson
(74) *Attorney, Agent, or Firm*—Young & Thompson

(57) ABSTRACT

In a manufacturing method of a color liquid crystal display device, a first conductive film is formed on a transparent insulating substrate to form a gate electrode and a gate bus line (first PR process). A gate insulating film, a semiconductor layer, an ohmic layer, and a second conductive film are deposited to form an island of a thin film transistor and a drain bus line (second PR process). Then, color filters in respective three colors are formed in their respective predetermined regions on the transparent insulating substrate in succession (third through fifth PR processes). A black matrix is formed, and a drain electrode and a source electrode are formed in the island by removing the second conductive film and ohmic layer on a region corresponding to the channel region by using the black matrix as a mask (sixth PR process). Then, a planarization film and a pixel electrode are formed (seventh and eighth PR processes).

4 Claims, 20 Drawing Sheets

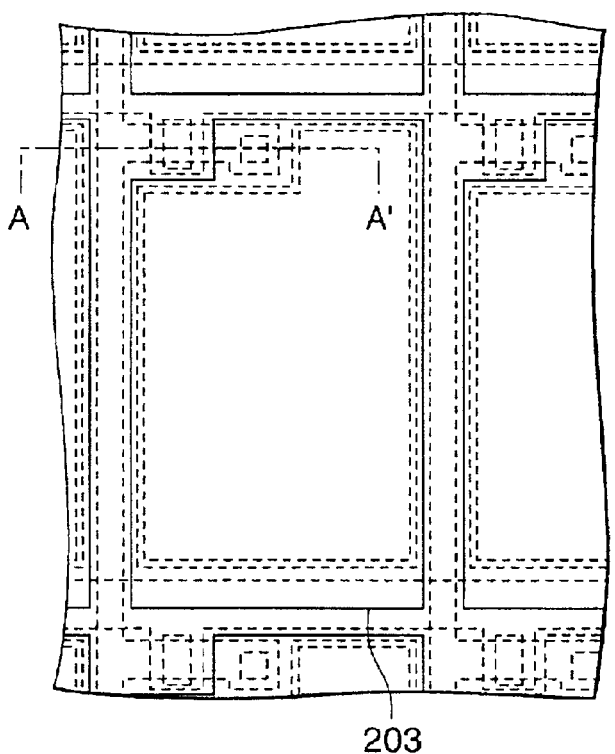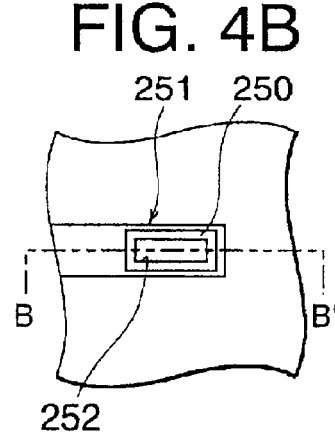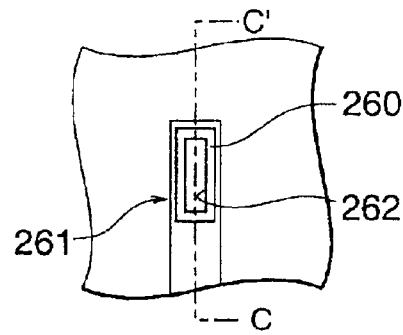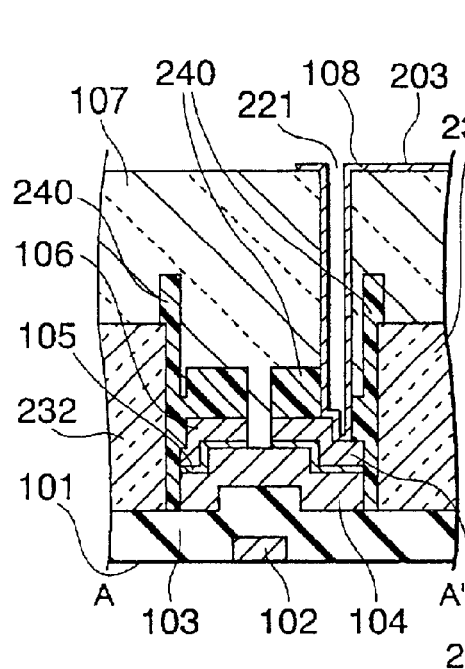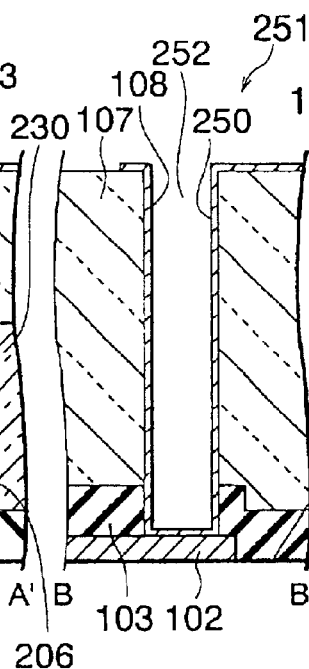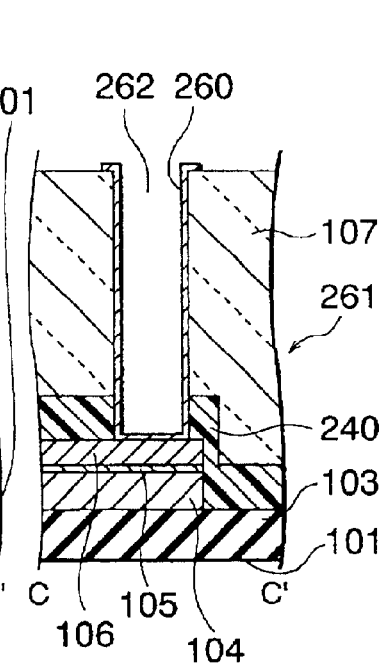

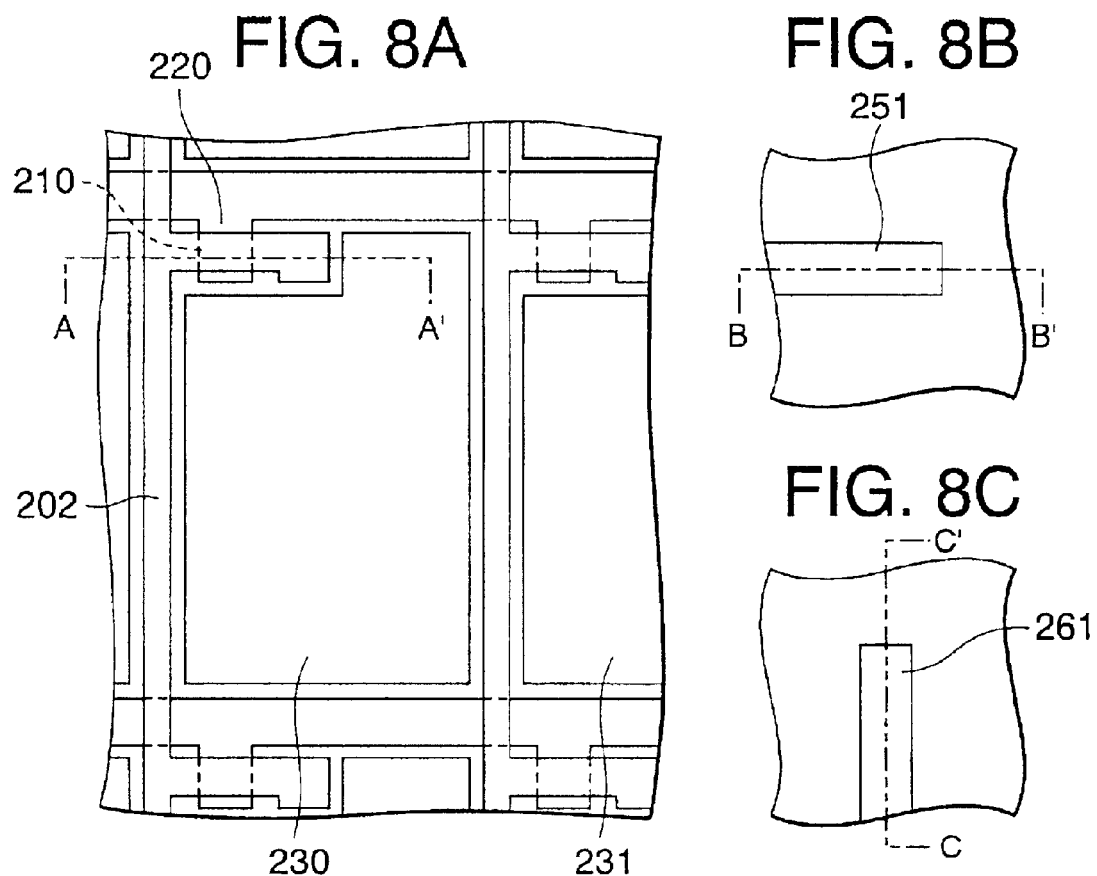
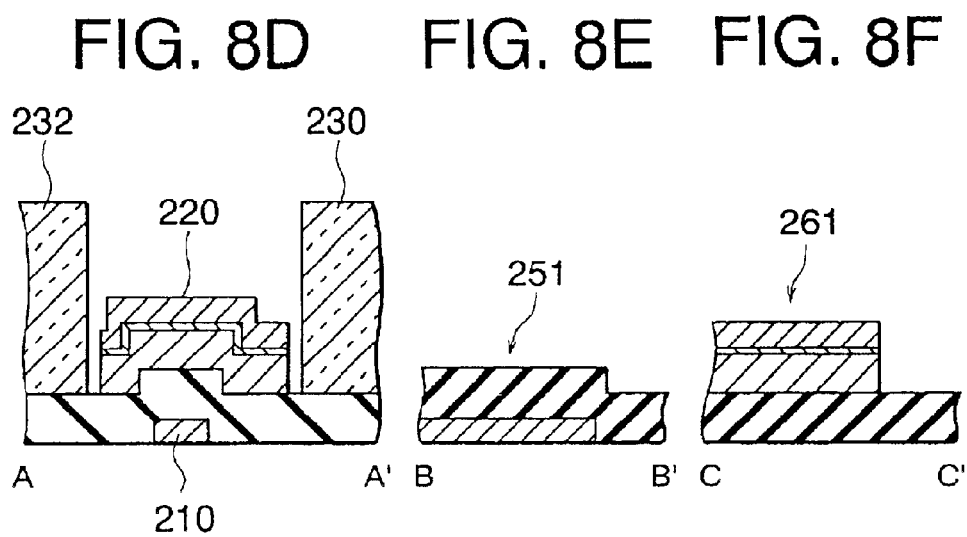

FIG. 9A
FIG. 9B
FIG. 9C
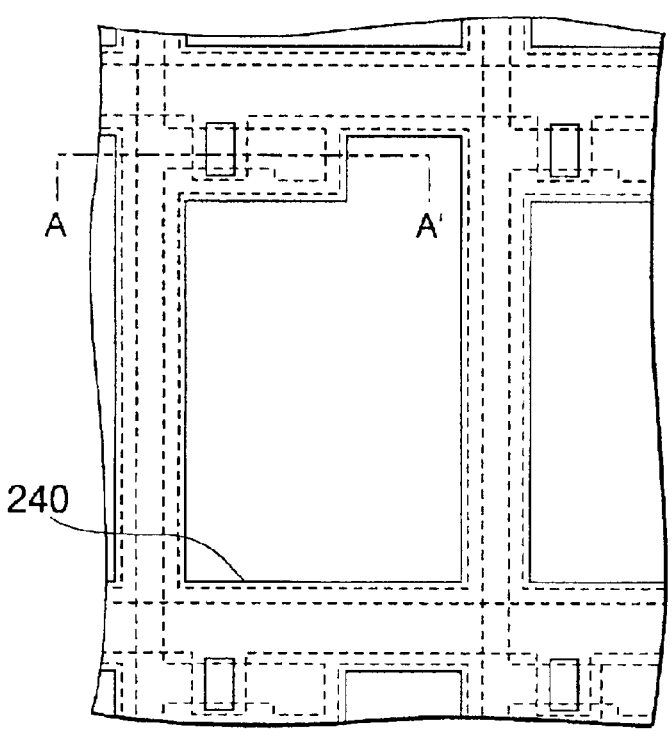
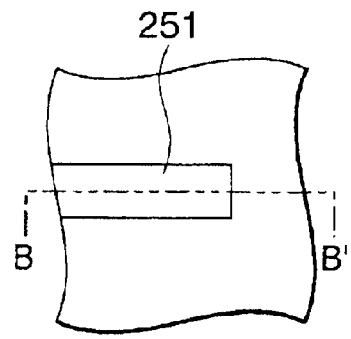
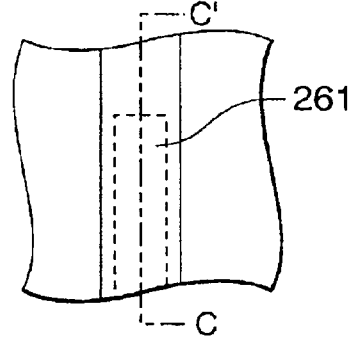
FIG. 9D   FIG. 9E   FIG. 9F
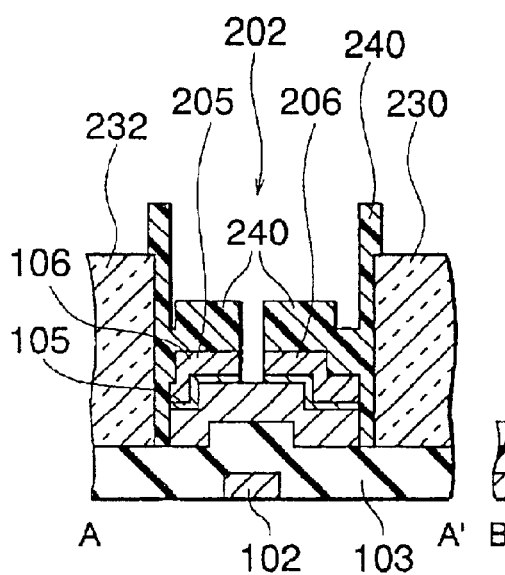
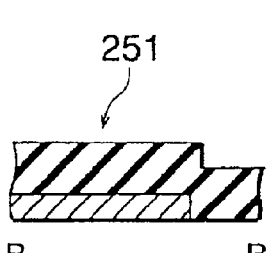
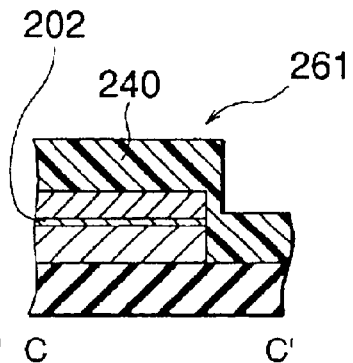

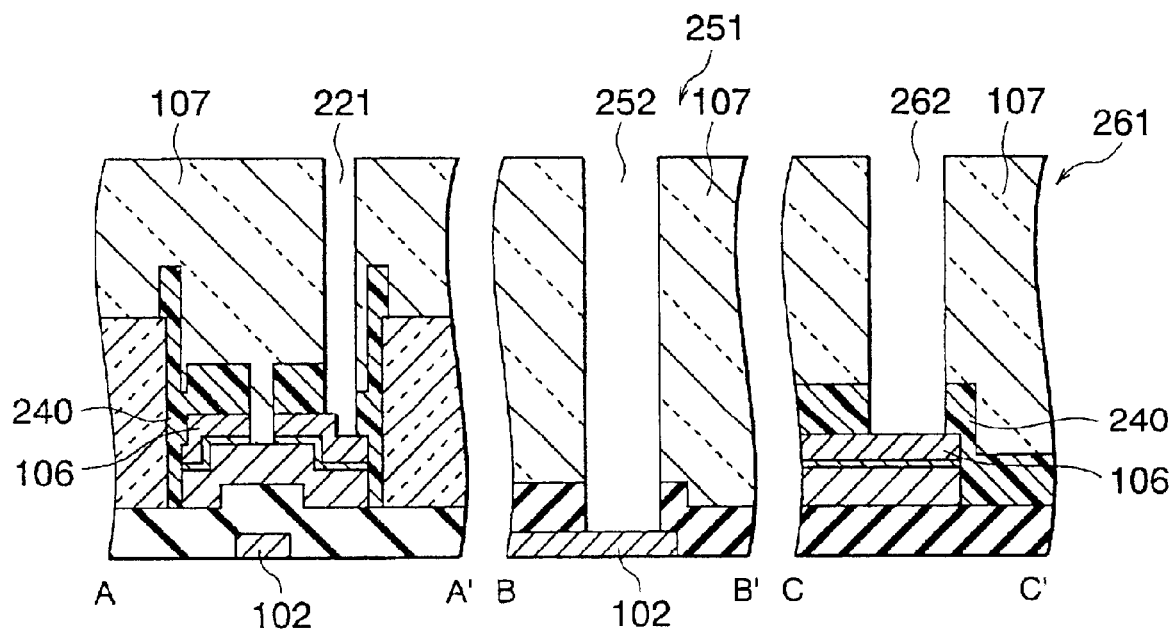

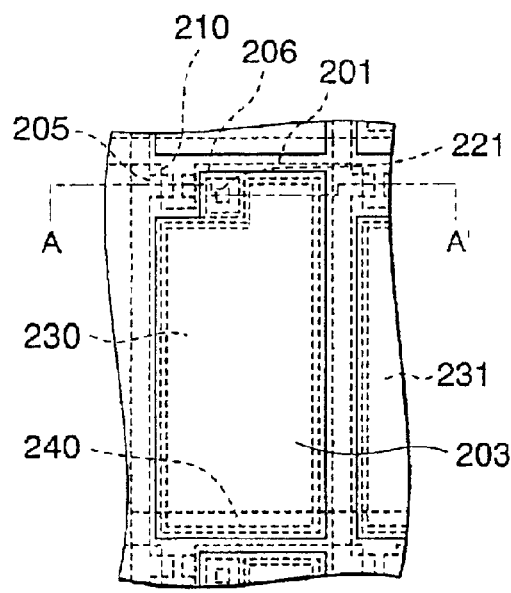
FIG. 11A
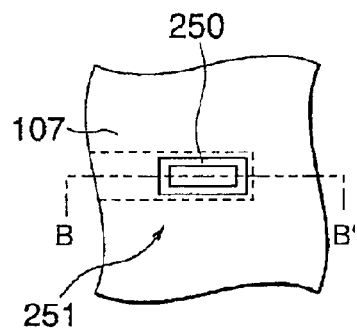
FIG. 11B
FIG. 11C
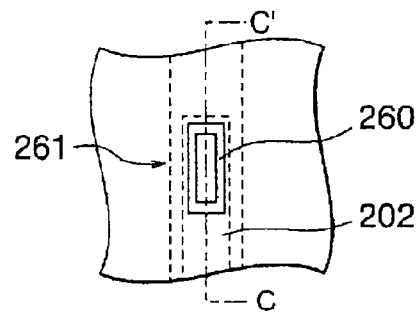
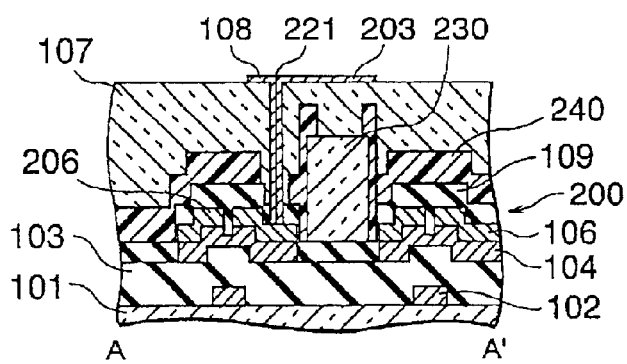
FIG. 11D
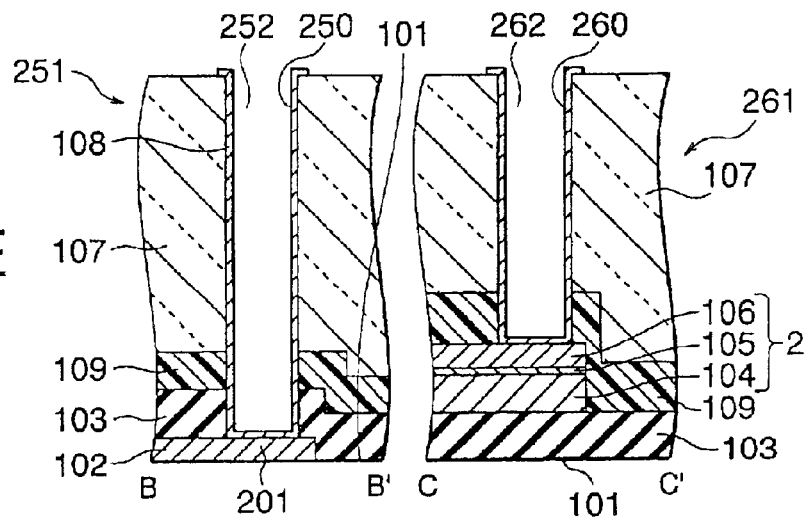
FIG. 11E  FIG. 11F FIG. 18A
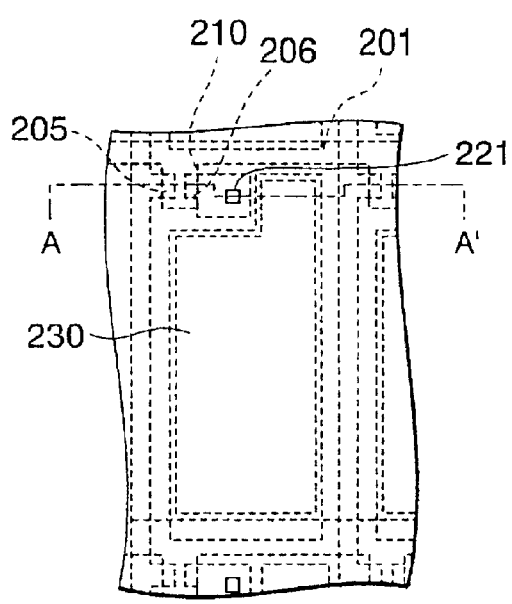
FIG. 18B
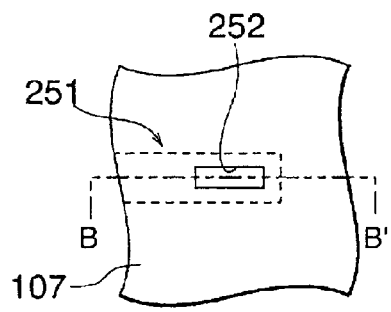
FIG. 18C
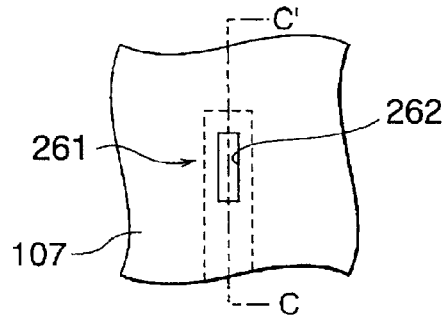
FIG. 18D
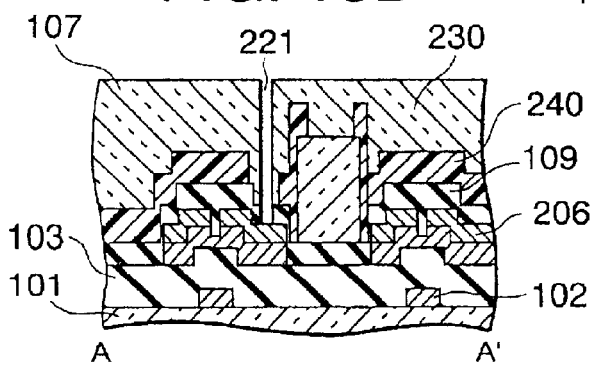
FIG. 18E  FIG. 18F
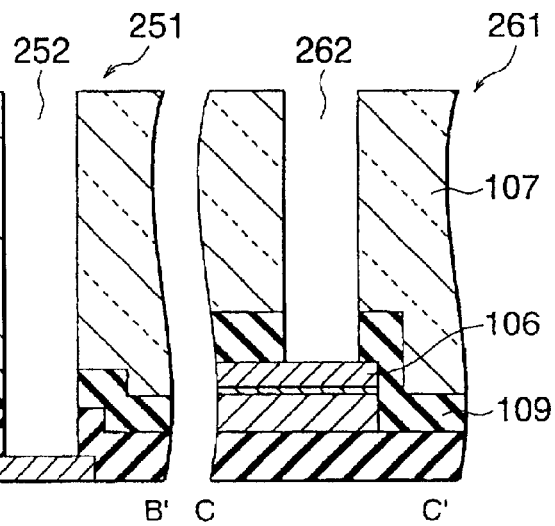
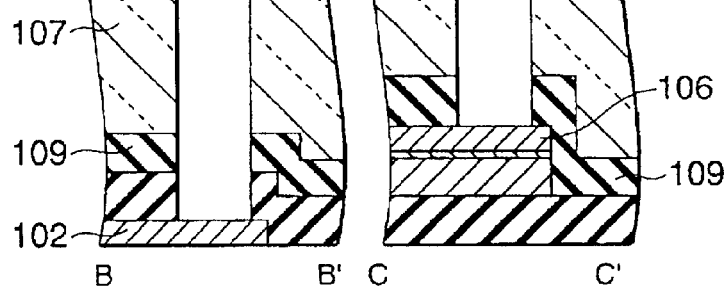

COLOR LIQUID CRYSTAL DISPLAY DEVICE AND MANUFACTURING METHOD OF THE SAME

BACKGROUND OF THE INVENTION

1. Field of the Invention

The present invention relates to a color liquid crystal display device, such as a color liquid crystal panel, and a manufacturing method of the same, and more particularly to a color liquid crystal display device including a color active matrix substrate composed of a substrate on which provided are thin film transistors (hereinafter, referred to as TFTs), color filters, and pixel electrodes, and a manufacturing method of the same.

2. Description of the Related Art

Today's active matrix type color liquid crystal display device employs a COT (color filter on transistor array) substrate, on which respective BGR (Blue, Green, and Red) color filters are formed as a unitary body, as an active matrix substrate provided with a matrix of pixel electrodes and a matrix of TFTs for controlling a voltage applied to the respective pixel electrodes. Liquid crystal is sandwiched between the COT substrate and a counter substrate provided to face the COT substrate, and driven by a voltage applied across the pixel electrodes and counter substrate, whereby color display is realized with color light having passed through the color filters.

FIG. 1 is a cross sectional view showing an example arrangement of a conventional COT substrate, and shows an arrangement of a COT substrate disclosed in Japanese Patent Laid-Open Publication No. Hei. 4-253028. FIG. 2 is a flowchart showing a manufacturing method of the conventional COT substrate. The following description will describe the arrangement of the conventional COT substrate with reference to FIGS. 1 and 2. Initially, as shown in Step S401 in FIG. 2, a film of tantalum (Ta) as a gate material is formed on the surface of a transparent glass substrate 401, and the film of tantalum is made into a predetermined pattern in a first photolithography process (hereinafter, referred to as PR process), whereby a gate electrode 402 and a gate bus line (not shown) are formed. Then, as shown in Step S402, after a gate insulating film 403 made of $SiN_x$ is formed, an intrinsic a-Si film (amorphous silicon film) 404 and a channel protecting film 405 are formed, and the channel protecting film 405 is made into a predetermined pattern in a second PR process. Then, as shown in Step S403, an $n^+$ type a-Si film 406 is formed, and both the $n^+$ type a-Si film 406 and intrinsic a-Si film 404 are patterned in a third PR process, whereby an island 407 is formed. Then, as shown in Step S404, a film of titanium (Ti) 408 is formed, which is made into a predetermined pattern in a fourth PR process, whereby a drain electrode 409, a source electrode 410, and a drain bus line (not shown) are formed.

Subsequently, as shown in Step S405, a transparent resin film 411 is formed over the entire surface, and a mask (not shown) is made into a predetermined pattern in a fifth PR process, after which an R color filter 412 is formed by selectively coloring the transparent resin film 411 in red by using the mask. Likewise, as shown in Step S406, a G color filter (not shown) is formed by selectively coloring another region of the transparent resin film 411 in green by using the mask (not shown) in a sixth PR process. Also, as shown in Step S407, a B color filter 413 is formed by selectively coloring still another region of the transparent resin film 411 in blue by using the mask (not shown) in a seventh PR process. Then, as shown in Step S408, a contact hole 414 is made through the transparent resin film 411 in an eighth PR process, so that the source electrode 410 is exposed partially. Then, as shown in Step S409, an ITO (Indium Tin Oxide) film is formed as a transparent electrode film over the entire surface, which is made into a predetermined pattern to cover regions over the respective color filters 412, 413, . . . , in a ninth PR process, whereby a pixel electrode 415 electrically connected to the source electrode 410 through the contact hole 414 is formed. Further, as shown in Step S410, the transparent resin film 411 at a region covering the island 407 is selectively colored in black by using the pixel electrode 415, whereby a BM (Black Matrix) 416 is formed. Subsequently, although it is not shown in the drawing, an orientation film is formed over the entire surface, whereupon the COT substrate is completed.

As has been discussed, with the conventional COT substrate, the gate electrode 402, channel protecting film 405 above the gate electrode 402, island 407, and drain and source electrodes 409 and 410 are formed in the TFT forming step, which requires four PR processes in total from the first through fourth PR processes. Also, the step of forming the respective RGB color filters 412, 413, . . . , and pixel electrode 415 requires five PR processes in total from the fifth through ninth PR processes. Hence, the overall fabrication step to manufacture the COT substrate requires nine PR processes in total, which involves too many manufacturing steps, thereby causing a cost increase of an active matrix type color liquid crystal display device.

SUMMARY OF THE INVENTION

It is an object of the present invention to provide a color liquid crystal display device achieving cost reduction by reducing the number of manufacturing steps, in particular, the number of the PR processes, and a manufacturing method of the same.

Each of first and second color liquid crystal display devices of the present invention comprise a color active matrix substrate having a transparent insulating substrate and a thin film transistor, a color filter, a black matrix, and a pixel electrode which are provided on the transparent insulating substrate. The thin film transistor has an inverted staggered structure in which a gate electrode, a gate insulating film, a semiconductor layer, an ohmic layer, and a pair of source and drain electrodes are deposited sequentially. In the first color liquid crystal display device of the present invention, the ohmic layer, source and drain electrodes, and black matrix are of the same shape as each other above a channel region formed in the semiconductor layer when seen in a deposit direction.

Also, in the second color liquid crystal display device of the present invention, the ohmic layer and source and drain electrodes are of the same shape as each other when seen in a deposit direction.

In the first and second color liquid crystal display devices, a drain bus line connected to the drain electrode may be of a laminated structure of metal films same as metal films respectively forming the semiconductor layer, ohmic layer, and source and drain electrodes. Also, it is preferable that the black matrix is formed in such a manner as to cover at least a part of a peripheral portion of the color filter.

According to the first color liquid crystal display device, because the ohmic layer, source and drain electrodes, and black matrix are of the same plane shape above a channel region, it is possible to form these elements in a single PR process. Also, according to the second color liquid crystal display device, because the ohmic layer and source and drain electrodes are of the same plane shape, it is possible to form these two elements in a single PR process.

Incidentally, the inverted staggered structure referred to herein means a structure in which the semiconductor layer is provided between the gate electrode/gate insulating film and the source and drain electrodes, and the gate electrode is formed at the bottom. By adapting the inverted staggered structure to the thin film transistor, not only can the gate insulating film and semiconductor layer be formed continuously, but also the MOS interface can be readily cleaned; moreover, ohmic contact between the source and drain electrodes and semiconductor layer can be achieved more easily.

A manufacturing method of the first color liquid crystal display device of the present invention comprises the steps of: forming a first conductive film on an entire surface of a transparent insulating substrate and patterning the first conductive film to form a gate electrode and a gate bus line; depositing a gate insulating film, a semiconductor layer, an ohmic layer, and a second conductive film on the entire surface and patterning them to form an island of a thin film transistor and a drain bus line; forming a color filter in a predetermined region on the transparent insulating substrate; forming a light shielding film on the entire surface and patterning the light shielding film to form a black matrix which covers the island other than a channel region and covers a region other than the color filter at least; forming a drain electrode and a source electrode in the island by removing the second conductive film and ohmic layer in a region corresponding to the channel region by using the black matrix as a mask; forming a planarization film on the entire surface and making a contact hole to expose the source electrode; and forming a transparent conductive film on the entire surface and patterning the transparent conductive film to form a pixel electrode, electrically connected to the source electrode, in such a manner as to include at least a region overlapping the color filter.

Also, a manufacturing method of the second color liquid crystal display device of the present invention comprises steps of: forming a first conductive film on an entire surface of a transparent insulating substrate and patterning the first conductive film to form a gate electrode and a gate bus line; depositing a gate insulating film, a semiconductor layer, an ohmic layer, and a second conductive film on the entire surface; making the second conductive film, ohmic layer, and semiconductor layer into a predetermined pattern by using a step-wise photoresist to form an island of a thin film transistor and a drain bus line; removing a thin film portion of the photoresist by ashing; forming a drain electrode and a source electrode by removing the second conductive film and ohmic layer in a region corresponding to a channel region by using a remaining portion of the photoresist; forming a color filter in a predetermined region on the transparent insulating substrate; forming a light shielding film on the entire surface and patterning the light shielding film to form a black matrix which covers the island and covers a region other than the color filter at least; forming a planarization film on the entire surface and making a contact hole to expose the source electrode; and forming a transparent conductive film on the entire surface and patterning the transparent conductive film to form a pixel electrode, electrically connected to the source electrode, in such a manner as to include at least a region overlapping the color filter.

Also, another manufacturing method of the second color liquid crystal display device of the present invention comprises the steps of: forming a first conductive film on an entire surface of a transparent insulating substrate and patterning the first conductive film to form a gate electrode and a gate bus line; depositing a gate insulating film, a semiconductor layer, an ohmic layer, and a second conductive film on the entire surface; forming a step-wise photoresist composed of a thin film portion and a thick film portion on the transparent insulating substrate; forming a drain electrode and a source electrode of a thin film transistor, and a drain bus line by making the second conductive film into a predetermined pattern by using the photoresist as a mask; removing the thin film portion of the photoresist by ashing; reflowing the thick film portion of the photoresist into a shape such that protects the drain electrode, source electrode, and a region between the drain electrode and source electrode; forming an island of the thin film transistor by removing the ohmic layer and semiconductor layer by using the photoresist as a mask having undergone reflow; removing the photoresist; forming a channel region by removing the ohmic layer in the region between the drain electrode and source electrode by using the drain electrode and source electrode as a mask; forming a color filter in a predetermined region on the transparent insulating substrate; forming a light shielding film on the transparent insulating substrate to form a black matrix which covers the island and cover a region other than the color filter at least; forming a planarization film on an entire surface of the transparent insulating substrate and making a contact hole to expose the source electrode; and forming a transparent conductive film to form a pixel electrode, electrically connected to the source electrode, in such a manner as to include at least a region overlapping the color filter.

The manufacturing method of the second color liquid crystal display device preferably includes a step of forming a transparent protection insulating film on the entire surface after the drain electrode and source electrode are formed, so that the color filter and black matrix are formed on the protection insulating film.

In the manufacturing methods of the first and second color liquid crystal display devices of the present invention, the color filter may be formed by coating a transparent color resin over the transparent insulating substrate followed by exposure and development into a predetermined pattern, and the black matrix may be formed by coating a black resin over the transparent insulating substrate followed by exposure and development into a predetermined pattern. Also, the color filter may have three types which are red, green and blue.

Alternatively, the color filter may be formed by printing a transparent color resin on the transparent insulating substrate in a predetermined pattern, and the black matrix may be formed by coating a black resin over the transparent insulating substrate followed by exposure and development into a predetermined pattern or printing the black resin on the transparent insulating substrate in a predetermined pattern.

Further, after the black matrix is formed by coating a black resin followed by exposure and development into a predetermined pattern or printing the black resin on the transparent insulating substrate in a predetermined pattern, the color filter may be formed by an ink jet method.

Further, in the manufacturing methods of the first and second color liquid crystal display devices, it may be arranged such that: a gate terminal portion contact hole is formed to expose an end portion of the gate bus line and a drain terminal portion contact hole is formed to expose an end portion of the drain bus line simultaneously with the contact hole; and a gate terminal electrically connected to the gate bus line and a drain terminal electrically connected to the drain bus line are formed of a part of the transparent conductive film.

Also, it is preferable that the light shielding film is patterned in such a manner as to cover a peripheral portion of the color filter at least in a part of the peripheral portion to form a black matrix.

According to the manufacturing methods of the present invention, both the first and second color liquid crystal display devices of the present invention can be manufactured in eight PR processes, thereby achieving cost reduction by reducing the number of the PR processes. Further, in case that the printing or ink jet method is used in the forming step of the color filters and black matrix, three or four more PR processes can be omitted, thereby making it possible to achieve further cost reduction.

As has been discussed, according to the color liquid crystal display devices of the present invention, because the ohmic layer, source and drain electrodes, and black matrix are of the same plane shape, or the ohmic layer and the source and drain electrodes are of the same plane shape, the steps of forming the ohmic layer, source and drain electrodes, and black matrix can be completed in a single PR process, thereby making it possible to reduce the number of PR processes in the fabrication step. Hence, according to the manufacturing methods of the present invention, it is possible to manufacture the color liquid crystal display devices of the present invention in eight PR processes, and the cost reduction can be achieved by reducing the number of PR processes.

BRIEF DESCRIPTION OF THE DRAWINGS

FIGS. 4A through 4F are plan views and cross sectional views showing the construction of the color liquid crystal display device in accordance with the first embodiment;

FIGS. 8A through 8F are plan views and cross sectional views showing a step following the step shown in FIGS. 7A through 7F in the manufacturing method of the color liquid crystal display device in accordance with the first embodiment;

FIGS. 9A through 9F are plan views and cross sectional views showing a step following the step shown in FIGS. 8A through 8F in the manufacturing method of the color liquid crystal display device in accordance with the first embodiment;

FIGS. 10A through 10F are plan views and cross sectional views showing a step following the step shown in FIGS. 9A through 9F in the manufacturing method of the color liquid crystal display device in accordance with the first embodiment;

FIGS. 11A through 11F are plan views and cross sectional views showing a construction of a color liquid crystal display device in accordance with a second embodiment of the present invention;

FIGS. 18A through 18F are plan views and cross sectional views showing a step following the step shown in FIGS. 17A through 17F in the manufacturing method of the color liquid crystal display device in accordance with the second embodiment;

DETAILED DESCRIPTION OF THE PREFERRED EMBODIMENTS

Figure 3:
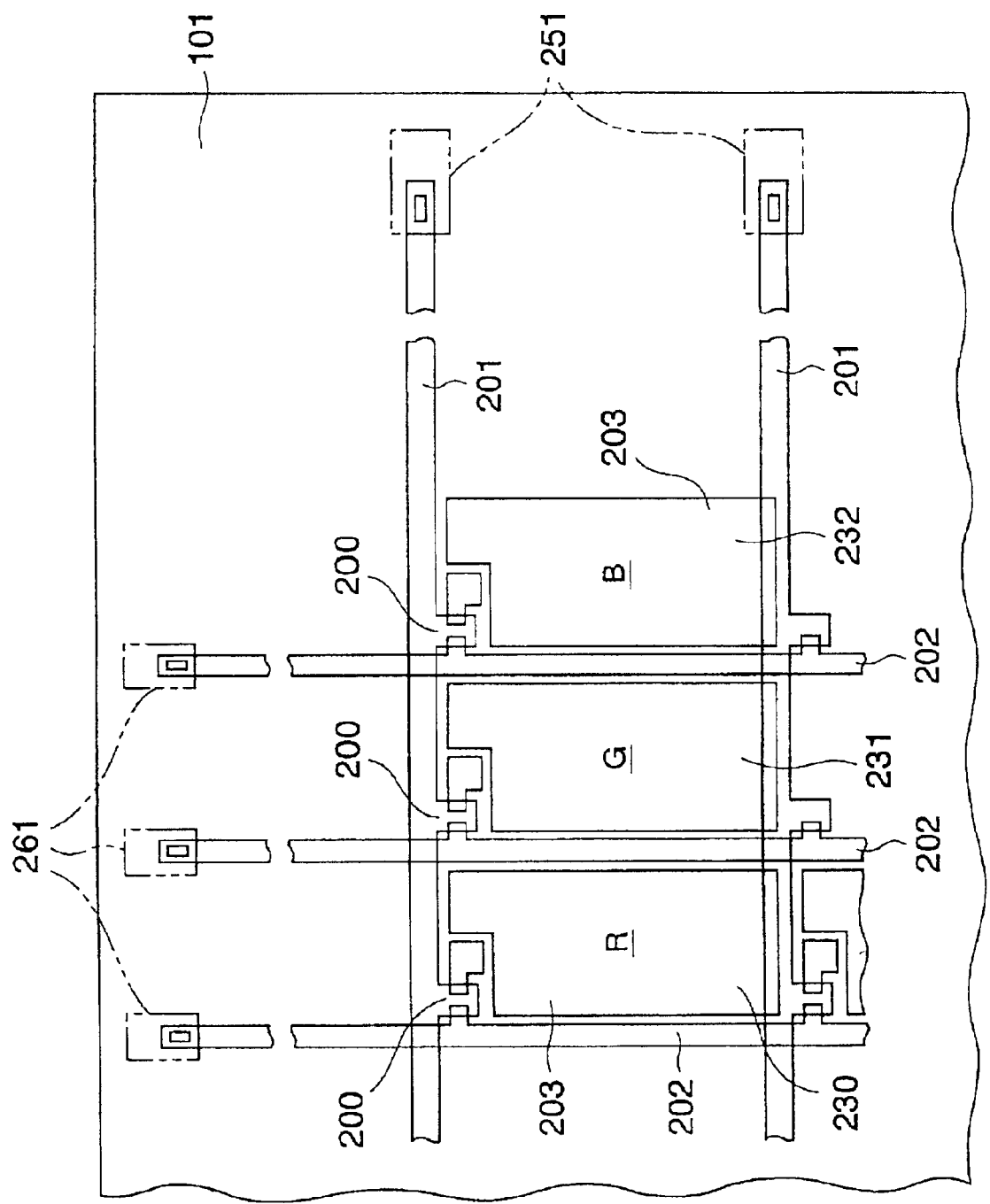
FIG. 3 is a plan view showing a COT substrate of an active matrix type color liquid crystal display device in accordance with a first embodiment of the present invention.

The following description will describe embodiments of the present invention in detail with reference to the accompanying drawings. To begin with, a first embodiment of the present invention will be explained. FIG. 3 is a plan view showing a COT substrate in an active matrix type color liquid crystal display device of the present embodiment. The COT substrate includes a transparent insulating substrate 101 on which provided are a plurality of gate bus lines 201 adequately spaced apart in parallel to each other, a plurality of drain bus lines 202 adequately spaced apart in parallel to each other in such a manner as to intersect at right angles with the gate bus lines 201, pixel electrodes 203 formed in regions defined by these bus lines, and TFTs 200 provided in the vicinity of intersections of the gate bus lines 201 and drain bus lines 202.

FIGS. 4A through 4F are plan views and cross sectional views showing an arrangement of the color liquid crystal display device of the present embodiment. FIG. 4A is a plan view showing a region corresponding to one pixel on the active matrix substrate, FIG. 4B is a plan view showing a gate terminal portion 251, and FIG. 4C is a plan view showing a drain terminal portion 261. FIGS. 4D through 4F are cross sectional views taken along lines AA', BB', and CC' in FIGS. 4A through 4C, respectively. As shown in FIG. 4D, in the TFT 200 (see FIG. 3), a gate electrode made of a Ti/Al film 102 is formed on the transparent insulating substrate 101, and a gate insulating film made of an SiN film 103 is formed on the gate electrode. Also, a semiconductor layer made of an intrinsic a-Si film 104 is formed on the gate insulating film to oppose the gate electrode through the gate insulating film, and an ohmic layer made of an $n^+$ type a-Si film 105 is formed on the semiconductor layer. Further, a pair of source and drain electrodes both made of a Cr film 106 are formed on the ohmic layer. The TFT 200 is of an inverted staggered structure.

A black matrix 240 is provided above and around the TFT 200. Also, in a channel region formed in the semiconductor layer, the ohmic layer, source and drain electrodes, and black matrix are of substantially the same shape when seen in one plane. A planarization film 107 is provided above the TFT 200, gate bus line 201, drain bus line 202, and respective RGB color filters 230 through 232, and a pixel electrode 203 made of an ITO film 108 is formed on the planarization film 107 at each region corresponding to regions over the respective RGB color filters 230 through 232. Also, a contact hole 221 is made through the planarization film 107 above the source electrode 206, and the ITO film 108 is formed on the inner wall of the contact hole 221. Consequently, the pixel electrode 203 is electrically connected to the source electrode 206 through the contact hole 221.

The gate electrode is connected to the gate bus line 201 (see FIG. 3), the drain electrode is connected to the drain bus line 202 (see FIG. 3), and the source electrode is connected to the pixel electrode 203 (see FIG. 3). Also, the respective RGB color filters 230 through 232 are formed and aligned in a predetermined manner, so that each is placed directly below the pixel electrode 203. Also, a gate terminal portion 251 is provided at one end of the gate bus line 201, and a drain terminal portion 261 is formed at one end or both ends of the drain bus line 202.

As shown in FIGS. 4B and 4E, at the gate terminal portion 251, the Ti/Al film 102, SiN film 103, and planarization film 107 are deposited on the transparent insulating substrate 101 in this order. The SiN film 103 and planarization film 107 are provided with a gate terminal portion contact hole 252, and the ITO film 108 is formed on the inner wall of the gate terminal portion contact hole 252. The ITO film 108 constitutes a gate terminal 250 as it is connected to the Ti/Al film 102.

On the other hand, as shown in FIGS. 4C and 4F, at the drain terminal portion 261, the intrinsic a-Si film 104, $n^+$ type a-Si film 105, and Cr film 106 are deposited on the transparent insulating substrate 101 in this order. Also, the black matrix 240 and planarization film 107 are deposited above and around the intrinsic a-Si film 104, $n^+$ type a-Si film 105, and Cr film 106. The black matrix 240 and planarization film 107 are provided with a drain terminal portion contact hole 262, and the ITO film 108 is formed on the inner wall of the drain terminal portion contact hole 262. The ITO film 108 constitutes a drain terminal 260 as it is connected to the Cr film 106. The gate terminals 250 and drain terminals 260 are aligned along the side peripheral portion (see FIG. 3) of the transparent insulating substrate 101. Here, the gate terminal 250 and drain terminal 260 are connected to tape-wise lines (not shown) connected to their respective driving circuits (drivers, not shown).

Figure 5:
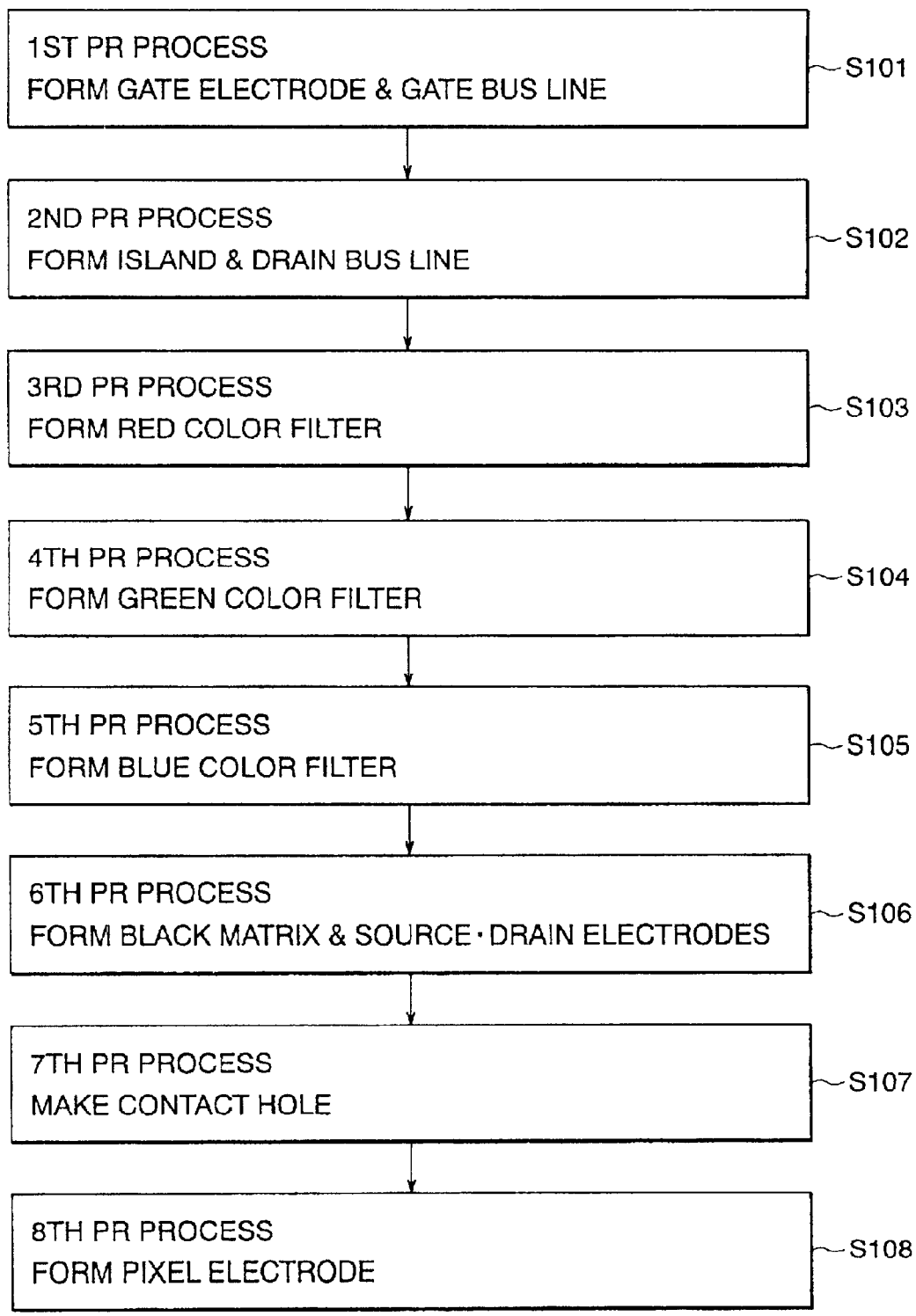
FIG. 5 is a flowchart showing a manufacturing method of the color liquid crystal display device in accordance with the first embodiment.
Figure 6A:
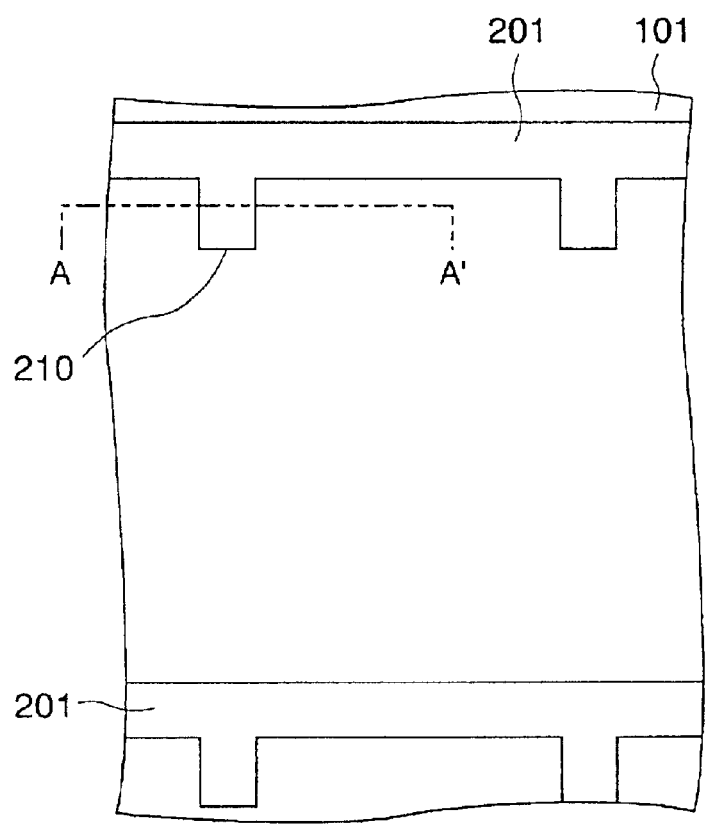
FIGS. 6A through 6F are plan views and cross sectional views showing the manufacturing method of the color liquid crystal display device in accordance with the first embodiment.
Figure 6B:
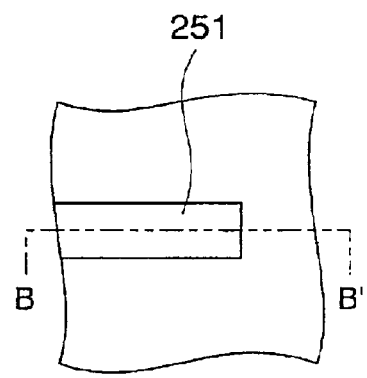
Figure 6C:
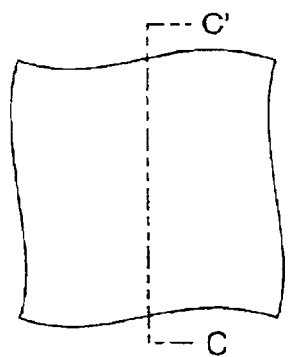
Figures 6D, 6E, 6F:
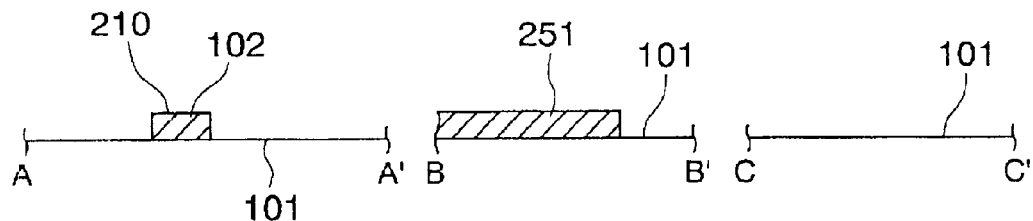

FIG. 5 is a flowchart showing a manufacturing method of the color liquid crystal display device of the present embodiment. As shown in FIG. 5, the COT substrate of the present embodiment is fabricated in first through eighth PR processes. More specifically, in a first PR process shown in Step S101, the gate electrode and gate bus line are formed. In a second PR process shown in Step S102, an island of the TFT portion and the drain bus line are formed on the gate insulating film. In third through fifth PR processes respectively shown in Steps S103 through S105, the RGB color filters are formed one by one in a pixel portion. In a sixth PR process shown in Step S106, the black matrix is formed over the region covering the island of the TFT other than the channel region and the region other than the color filters, and at the same time, the source and drain electrodes are formed. Further, in a seventh PR process shown in Step S107, contact holes are provided to the source electrode portion and gate and drain electrode portions, respectively. Then, in an eighth PR process shown in Step S108, the pixel electrode is formed.

Also, FIGS. 6A through 6F, 7A through 7F, 8A through 8F, 9A through 9F, and 10A through 10F are plan views and cross sectional views showing major steps in the manufacturing method of the liquid crystal display device of the present embodiment. Here, FIGS. 6A, 7A, 8A, 9A, 10A and 4A are plan views each showing a region corresponding to one pixel on the active matrix substrate. FIGS. 6B, 7B, 8B, 9B, 10B, and 4B are plan views each showing the gate terminal portion. FIGS. 6C, 7C, 8C, 9C, 10C, and 4C are plan views each showing the drain terminal portion. FIGS. 6D, 7D, 8D, 9D, 10D, and 4D are cross sectional views each taken along the line AA'. FIGS. 6E, 7E, 8E, 9E, 10E, and 4E are cross sectional views each taken along the line BB'. FIGS. 6F, 7F, 8F, 9F, 10F, and 4F are cross sectional views each taken along the line CC'. The following description will describe the fabrication step step by step with reference to these drawings.

First, as shown in FIGS. 6A through 6F, the Ti/Al film 102 made of a lamination of Al and Ti is formed on the transparent insulating substrate 101 made of glass or the like in a thickness of 0.1 to 0.3 μm by means of sputtering. In the first PR process, a first photoresist (not shown) is exposed and developed into a predetermined pattern on the Ti/Al film 102 by using a first photomask (not shown). Then, the Ti/Al film 102 is subjected to dry etching by using the first photoresist as a mask, whereby the gate electrode 210 and gate bus line 201 are formed. At this point, the gate terminal portion 251 is formed at the end of the gate bus line 201.

Subsequently, as shown in FIGS. 7A through 7F, the SiN film 103 is formed as the gate insulating film on the entire surface in a thickness of 0.3 to 0.6 μm by means of plasma CVD (Chemical Vapor Deposition). Also, the intrinsic a-Si film 104 is formed as the semiconductor layer on the SiN film 103 in a thickness of 0.05 to 0.3 μm by means of plasma CVD, on which the $n^+$ type a-Si film 105 doped with phosphorus is formed as the ohmic layer in a thickness of 20 to 100 nm by means of plasma CVD. Further, the Cr film 106 is formed on the $n^+$ type a-Si film 105 in a thickness of approximately 0.1 to 0.3 μm by means of sputtering. Then, in the second PR process, a second photoresist (not shown) is exposed and developed into a predetermined pattern by using a second photomask (not shown) on the entire surface, and the Cr film 106 is subjected to wet etching by using the second photoresist as a mask, while subjecting the $n^+$ type a-Si film 105 and intrinsic a-Si film 104 to dry etching in succession, whereby an island 220 is formed above the gate electrode 210 through the gate insulting film (SiN film 103) together with the drain bus line 202. At this point, the drain terminal portion 261 is formed at the end of the drain bus line 202. The island 220 and drain bus line 202 are formed by depositing the intrinsic a-Si film 104, n⁺ type a-Si film 105, and Cr film 106 in this order.

Subsequently, as shown in FIGS. 8A through 8F, a red photosensitive acrylic resin is coated over the entire surface in a thickness of 1.8 μm followed by baking, and in the third PR process, exposed and developed into a predetermined pattern by using a third photomask (not shown), so that the R color photosensitive acrylic resin is left in a selected region within a region defined by the gate bus lines 201 and drain bus lines 202, whereby the R color filter 230 is formed. In the same manner, a green photosensitive acrylic resin as thick as the R color filter 230 is coated over the entire surface followed by baking, and in the fourth PR process, exposed and developed into a predetermined pattern by using a fourth photomask (not shown), so that the G color transparent resin is left in a selected region other than the R color filter 230 region within the region defined by the gate bus lines 201 and drain bus lines 202, whereby the G color filter 231 is formed. Further, a blue photosensitive acrylic resin as thick as the R color filter 230 is coated over the entire surface followed by baking, and in the fifth PR process, exposed and developed into a predetermined pattern by using a fifth photomask (not shown), so that the B color transparent resin is left in the remaining region other than the R color filter region and G color filter region within the region defined by the gate bus lines 201 and drain bus lines 202, whereby the B color filter 232 is formed. It should be appreciated that the respective color filters 230, 231, and 232 are aligned in a repetitive manner as shown in FIG. 3, for example.

Figure 7A:
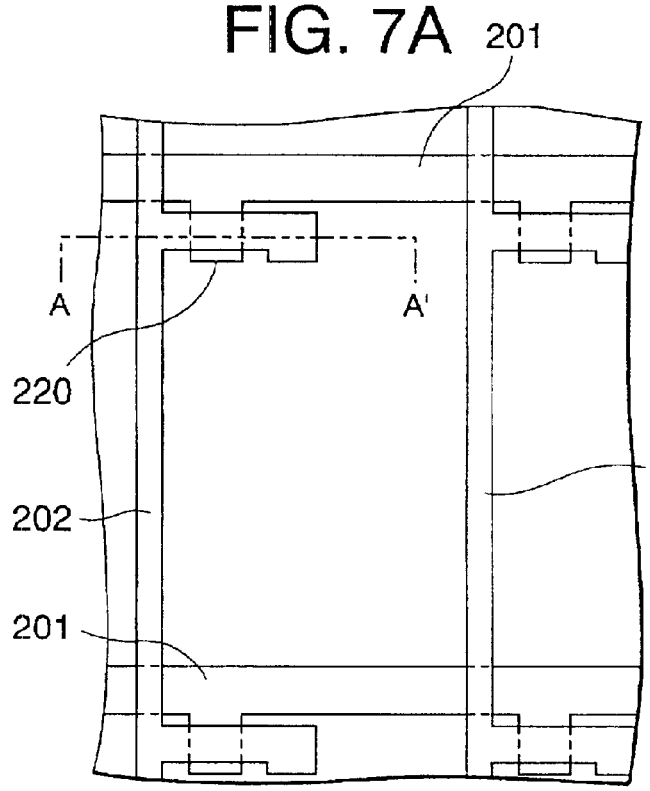
FIGS. 7A through 7F are plan views and cross sectional views showing a step following the step shown in FIGS. 6A through 6F in the manufacturing method of the color liquid crystal display device in accordance with the first embodiment.
Figure 7B:
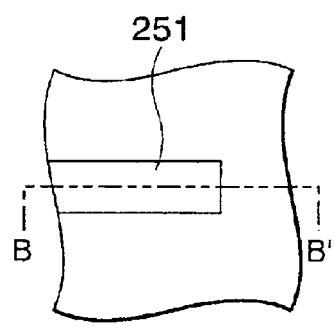
Figure 7C:
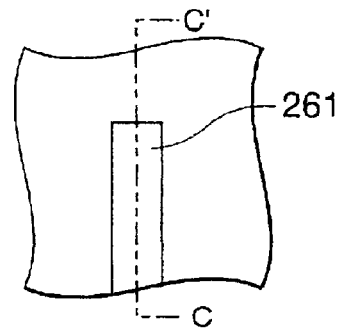
Figure 7D:
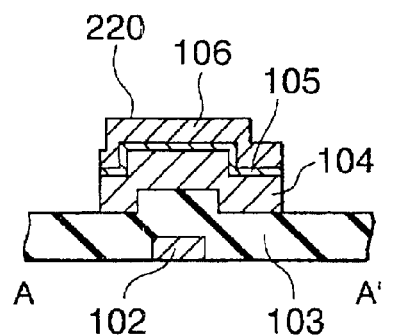
Figure 7E:
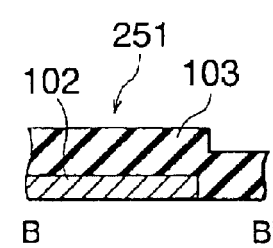
Figure 7F:
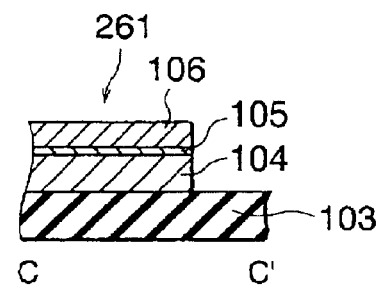

Subsequently, as shown in FIGS. 9A through 9F, a non-light-transmitting black photosensitive acrylic resin is coated over the entire surface in a thickness of 1.0 μm followed by baking, and in the sixth PR process, exposed and developed by using a sixth photomask (not shown), so that the black photosensitive acrylic resin is formed on regions other than the respective RGB color filters 230 through 232, that is, only the regions respectively covering above the island 220 (see FIG. 8D), gate bus line 201, (see FIG. 7A), and drain bus line 202 (see FIG. 7A). Consequently, the black matrix 240 is formed of the black photosensitive acrylic resin, which covers the regions other than the respective RGB color filters 230 through 232 to shield these regions from light. Here, a part of the black matrix 240 on the island 220 is removed in the channel region at or almost at the center of the island 220. Also, the black matrix 240 is removed at the gate terminal portion 251. At the drain terminal portion 261, the black matrix 240 is formed so as to cover the drain bus line 202.

Then, the black matrix 240 is masked, and the Cr film 106 provided beneath is subjected to wet etching and dry etching, and further the n⁺ type a-Si film 105 is subjected to dry etching. As a result of these etchings, in the island 220 (see FIG. 8D), the Cr film 106 is separated and the drain electrode 205 and source electrode 206 are formed, while the ohmic layer made of the n⁺ type a-Si film 105 is formed beneath each of the electrodes 205 and 206. In this manner, the TFT 200 is fabricated.

Subsequently, as shown in FIGS. 10A through 10F, a colorless transparent photosensitive acrylic resin is coated as the planarization film 107 over the entire surface on the color filters 230 through 232 in a thickness of 2.5 to 3.0 μm followed by baking. Then, in the seventh PR process, the colorless transparent photosensitive acrylic resin is exposed and developed by using a seventh photomask (not shown), so that openings are made above a part of the source electrode 206 (see FIG. 9D), a part of the gate terminal portion 251, and a part of the drain terminal portion 261, respectively. Further, the black matrix 240 is subjected to dry etching by using the planarization film 107 as a mask. Further, at the gate terminal portion 251, the SiN film 103 forming the gate insulating film is subjected to dry etching. As a result, the contact hole 221 is made through the island 220, and the surface of the Cr film 106 forming the source electrode 206 is exposed. Also, at the gate terminal portion 251, the gate terminal portion contact hole 252 is made, and the Ti/Al film 102 forming a part of the gate bus line 201 is exposed. Further, at the drain terminal portion 261, the drain terminal portion contact hole 262 is made, and the surface of the Cr film 106 forming the drain bus line 202 is exposed.

Subsequently, as shown in FIGS. 4A through 4F, the ITO film 108 is formed as a transparent electrode film on the entire surface in a thickness of 30 to 100 nm by means of sputtering. Then, in the eighth PR process, an eighth photoresist (not shown) is exposed and developed into a predetermined pattern by using an eighth photomask (not shown) on the ITO film 108, after which the ITO film 108 is subjected to wet etching by using the eighth photoresist as a mask. Consequently, the pixel electrode 203 made of the ITO film 108 is formed over each of the RGB color filters 230 through 232, and a part of the pixel electrode 203 is electrically connected to the source electrode 206 through the contact hole 221. In addition, the ITO film 108 at the gate terminal portion 251 forms the gate terminal 250 electrically connected to the Ti/Al film 102 through the gate terminal portion contact hole 252. Likewise, the ITO film 108 at the drain terminal portion 261 forms the drain terminal 260 as it is electrically connected to the Cr film 106 through the drain terminal portion contact hole 262. In order to facilitate the gap control during the cell fabrication step, a column (not shown) may be formed in an optionally following ninth PR process by coating and baking a colorless transparent photosensitive acrylic resin, followed by exposure and development using a ninth photomask (not shown).

Subsequently, although it is not shown in the drawings, an orientation film is formed on the surface, whereupon the COT substrate is fabricated. Then, a counter substrate provided with the common electrode, orientation film, etc. is placed to oppose the COT substrate and the two substrates are laminated into a unitary body with a microscopic space therebetween. After then the space between the COT substrate and counter substrate is filled with the liquid crystal and sealed, whereupon a color liquid crystal display device is completed. Also, the gate terminal and drain terminal are electrically connected to their respective driver circuits.

As has been discussed, according to the first embodiment of the present invention, it is possible to manufacture a color active matrix substrate in the first through eighth PR processes (ninth PR process is added in case that the column is formed). Consequently, compared with the conventional manufacturing method involving nine PR processes, one PR process can be omitted, thereby making it possible to provide a color liquid crystal display device at a lower cost.

In the present embodiment, the D/I (Drain and Island) full plate etching is performed in the second PR process. Performing the D/I full plate etching in manufacturing the TFT substrate generally leaves a large step difference at the island portion, which raises a problem that it becomes difficult to control the orientation of the liquid crystal molecules particularly in the IPS (In Plane Switching) mode for driving the liquid crystal by a lateral electric field. Also, the coverage of the passivation film is deteriorated, which results in a problem that the materials forming the source and drain electrodes dissolve into the liquid crystal and readily induce unwanted smear on the display during the operation of the liquid crystal display device. In the present embodiment, however, because the step difference at the island portion is compensated with the black matrix 240 and planarization film 107, it is possible to suppress the occurrence of the foregoing problems. Consequently, the liquid crystal display device attains better orientation control and becomes more reliable.

Also, with the liquid crystal display device of the first embodiment of the present invention, the black matrix is formed to cover the peripheral portions of the respective RGB color filters. This makes it possible to clearly distinguish the boundary of the peripheral portion of each color filter by the black matrix, and therefore, is effective in displaying a sharp image. It should be noted, however, that because the black matrix above the channel of the TFT is removed in the present embodiment, the black matrix also has to be formed on the counter substrate side.

Figure 1:
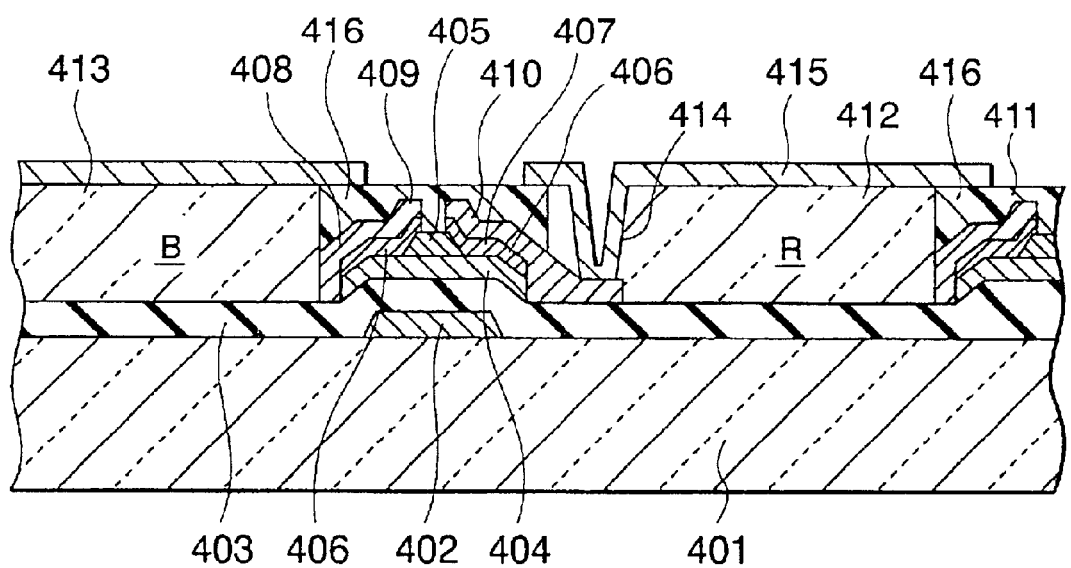
FIG. 1 is a cross sectional view showing one exemplified construction of a conventional COT substrate.
Figure 2:
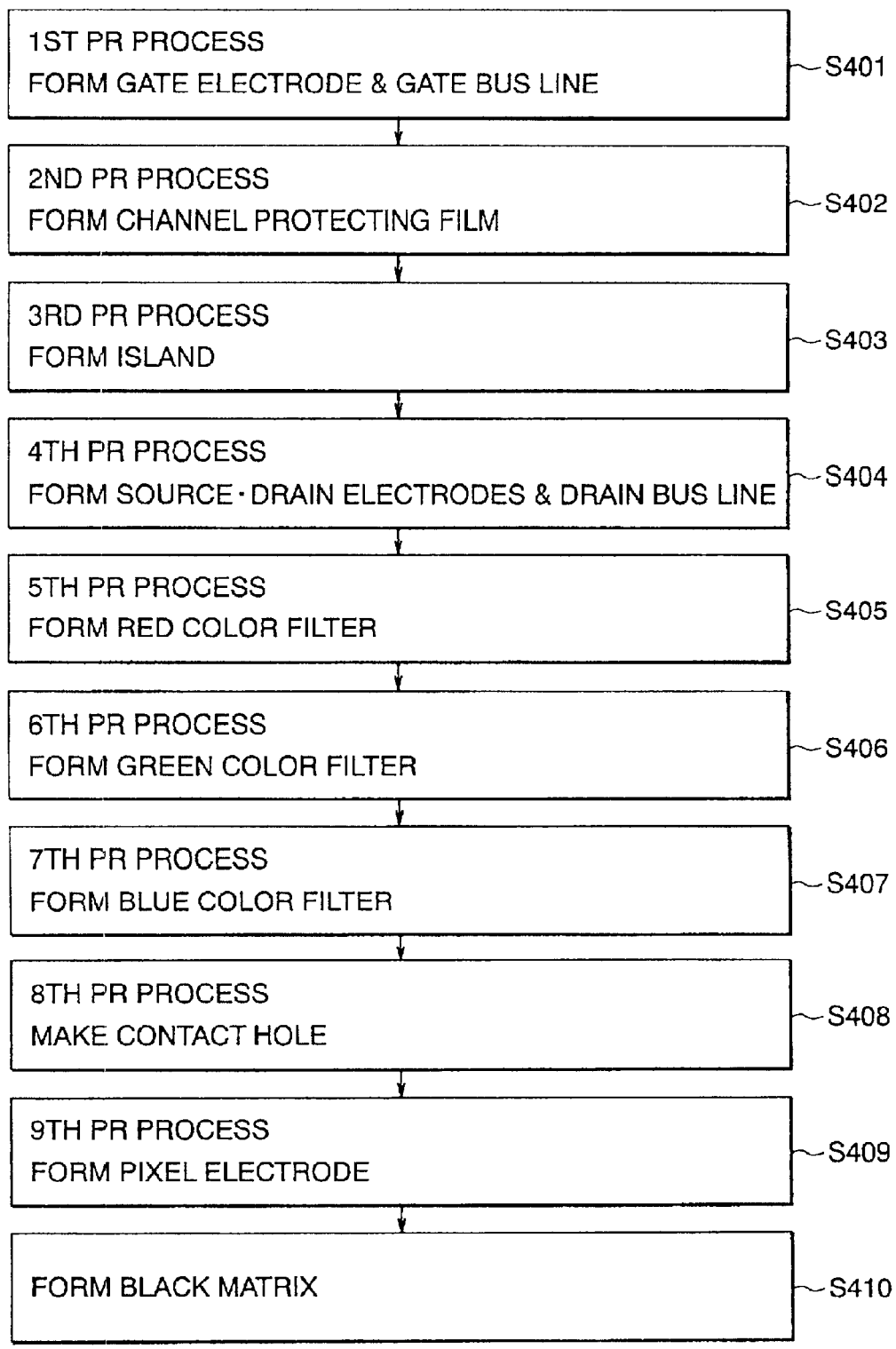
FIG. 2 is a flowchart showing a manufacturing method of a conventional color liquid crystal display device.

The following description will describe a second embodiment of the present invention. An overall arrangement of a COT substrate in an active matrix type color liquid crystal display device of the present embodiment is the same as the arrangement of the COT substrate shown in FIG. 1. FIGS. 11A through 11F are plan views and cross sectional views showing a construction of the color liquid crystal display device of the present embodiment. FIG. 11A is a plan view showing a region corresponding to one pixel on the active matrix substrate, FIG. 11B is a plan view showing a gate terminal portion 251, and FIG. 11C is a plan view showing a drain terminal portion 261. FIGS. 11D through 11F are cross sectional views taken along the lines AA', BB' and CC' in FIGS. 11A through 11C, respectively. As shown in FIG. 11D, in a TFT 200, a gate electrode made of a Ti/Al film 102 is formed on a transparent insulating substrate 101, and a gate insulating film made of an SiN film 103 is formed on the gate electrode. A semiconductor layer made of an intrinsic a-Si film 104 is formed on the gate insulating film to oppose the gate electrode through the gate insulating film. An ohmic layer made of an $n^+$ type a-Si film (not shown) is formed on the semiconductor layer. Further, a pair of source and drain electrodes both made of a Cr film 106 are formed on the ohmic layer. A passivation film 109 is formed above and around the TFT 200, and a black matrix 240 or color filters 230 through 232 are provided on the passivation film 109. Also, in a channel region formed in the semiconductor layer, the ohmic layer and source and drain electrodes are of substantially the same shape when seen in one plane. A planarization film 107 is provided above the TFT 200, a gate bus line 201, a drain bus line 202, the respective RGB color filters 230 through 232, and the black matrix 240, and a pixel electrode 203 made of an ITO film 108 is formed on the planarization film 107 at each region corresponding to regions over the respective RGB color filters 230 through 232. Also, a contact hole 221 is formed through the planarization film 107 above the source electrode 206, and the ITO film 108 is formed on the inner wall of the contact hole 221. Consequently, the pixel electrode 203 is electrically connected to the source electrode 206 through the contact hole 221.

The gate electrode is connected to the gate bus line 201 (see FIG. 3), the drain electrode is connected to the drain bus line 202 (see FIG. 3), and the source electrode is connected to the pixel electrode 203. Also, the gate terminal portion 251 is provided at one end of the gate bus line 201, and the drain terminal portion 261 is formed at one end or both ends of the drain bus line 202.

As shown in FIGS. 11B and 11E, at the gate terminal portion 251, the Ti/Al film 102, SiN film 103, passivation film 109, and planarization film 107 are deposited on the transparent insulating substrate 101 in this order. The SiN film 103, passivation film 109, and planarization film 107 are provided with a gate terminal portion contact hole 252, and the ITO film 108 is formed on the inner wall of the gate terminal portion contact hole 252. The ITO film 108 constitutes a gate terminal 250 as it is connected to the Ti/Al film 102.

On the other hand, as shown in FIGS. 11C and 11F, at the drain terminal portion 261, the SiN film 103 is formed on the transparent insulating substrate 101, over which the intrinsic a-Si film 104, $n^+$ type a-Si film 105, and Cr film 106 are deposited in this order, whereby the drain bus line 202 is formed. Also, the passivation film 109 and planarization film 107 are deposited above and around the drain bus line 202. The passivation film 109 and planarization film 107 are provided with a drain terminal portion contact hole 262, and the ITO film 108 is formed on the inner wall of the drain terminal portion contact hole 262. The ITO film 108 constitutes a drain terminal 260 as it is connected to the Cr film 106. The gate terminals 250 and drain terminals 260 are aligned along the side peripheral portion (see FIG. 3) of the transparent insulating substrate 101. Here, the gate terminal 250 and drain terminal 260 are connected to tape-wise lines (not shown) connected to their respective driving circuits (drivers, not shown).

Figure 12:
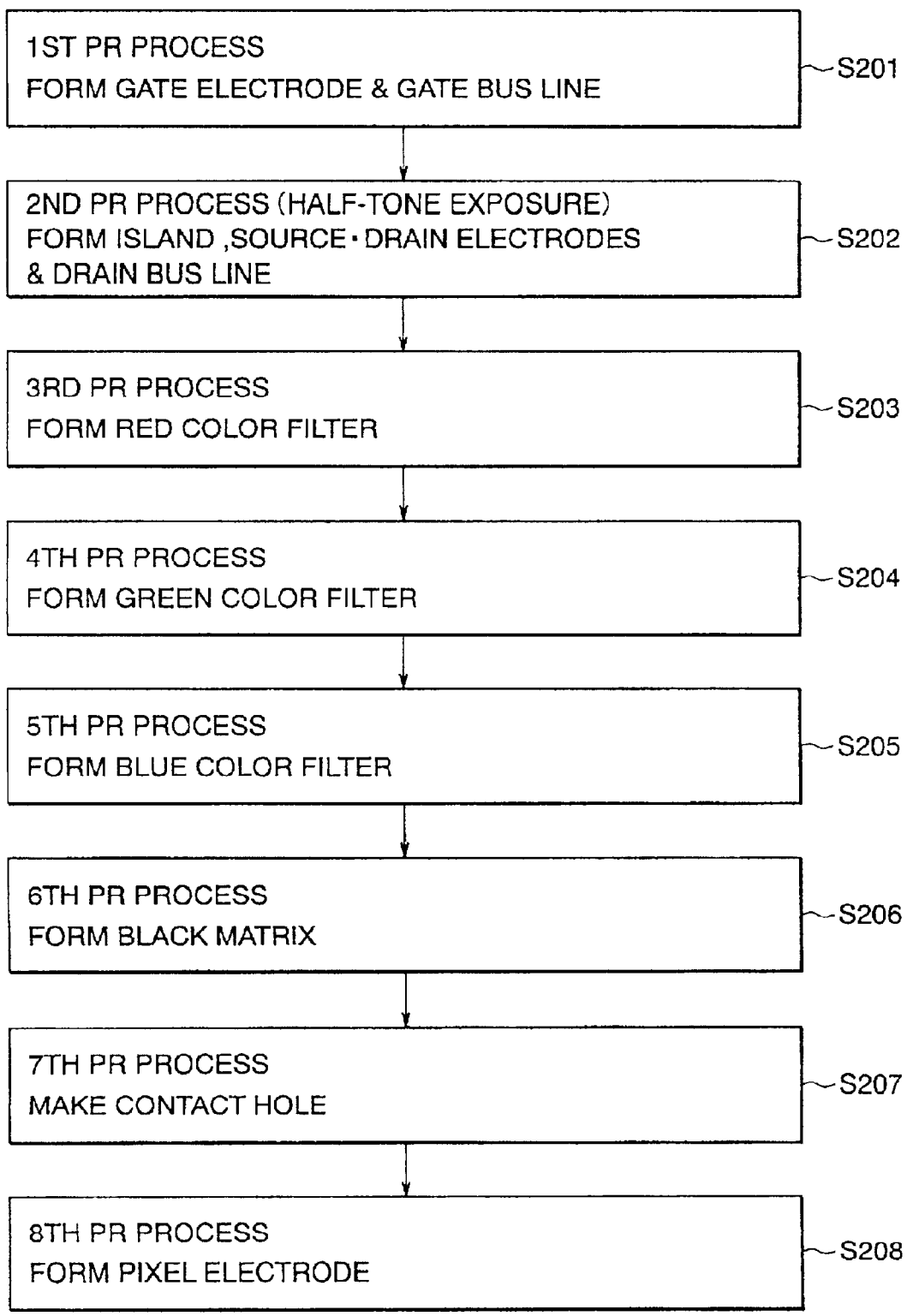
FIG. 12 is a flowchart showing a manufacturing method of the color liquid crystal display device in accordance with the second embodiment.
Figure 13A:
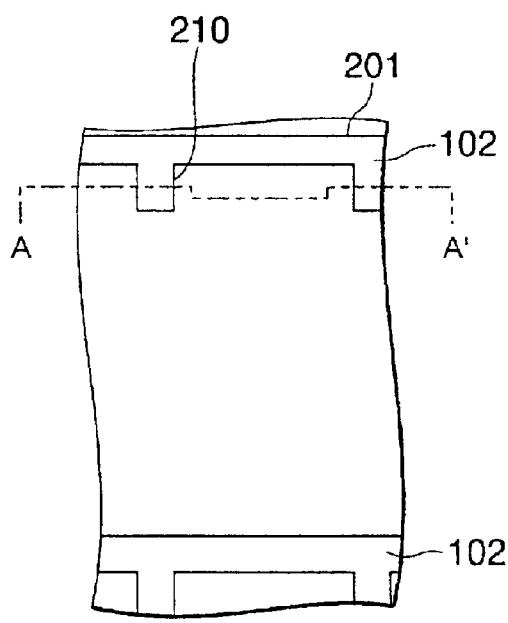
FIGS. 13A through 13F are plan views and cross sectional views showing a manufacturing method of the color liquid crystal display device in accordance with the second embodiment.
Figure 13B:
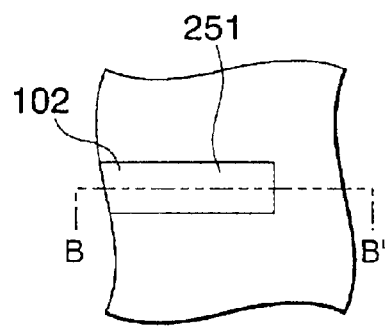
Figure 13C:
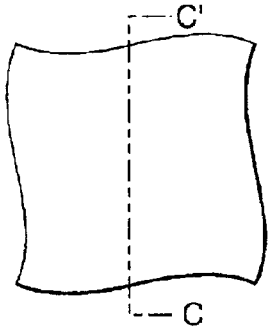
Figure 13D:
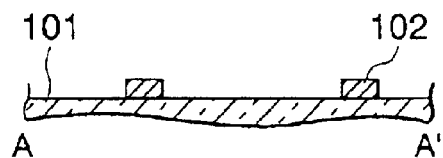
Figures 13E, 13F:
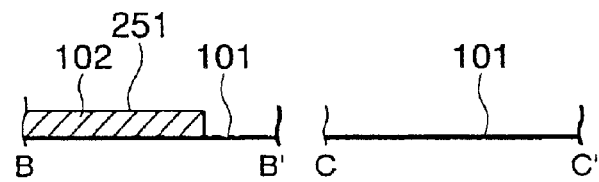
Figure 14A:
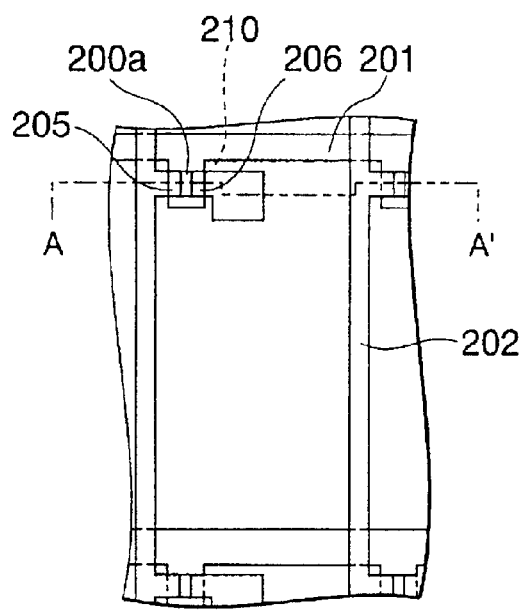
FIGS. 14A through 14F are plan views and cross sectional views showing a step following the step shown in FIGS. 13A through 13F in the manufacturing method of the color liquid crystal display device in accordance with the second embodiment.
Figure 14B:
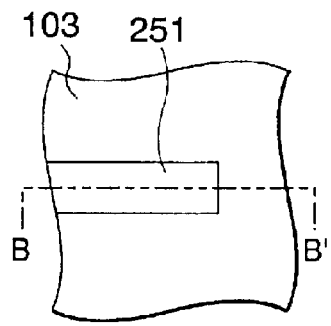
Figure 14C:
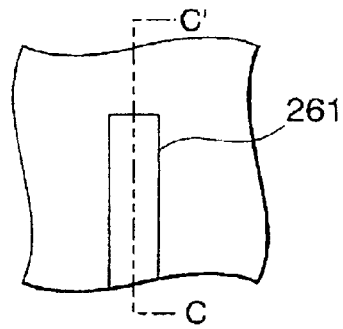
Figure 14D:
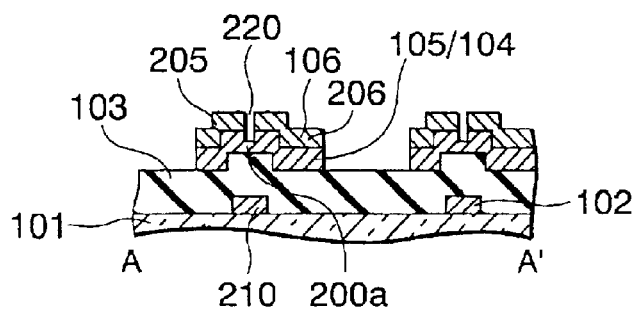
Figures 14E, 14F:
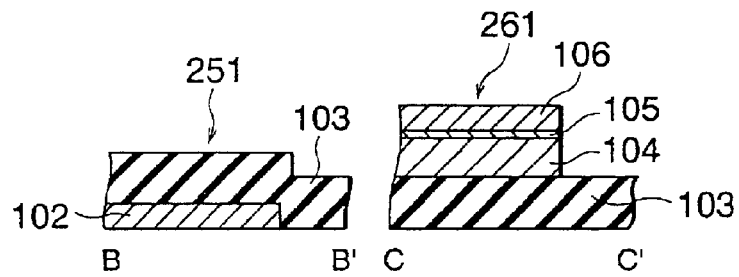

FIG. 12 is a flowchart showing the manufacturing method of the liquid crystal display device in accordance with the second embodiment of the present invention. As shown in FIG. 12, like in the first embodiment, the COT substrate of the second embodiment is fabricated in first through eighth PR processes. More specifically, in a first PR process shown in Step S201, the gate electrode and gate bus line are formed. In a second PR process shown in Step S202, an island of the TFT portion is formed on the gate insulating film, after which the source electrode, drain electrode, and drain bus line are formed by means of half-tone exposure or double exposure, which will be described below. In third through fifth PR processes respectively shown in Steps S203 through S205, the RGB color filters are formed in a pixel portion one by one. In a sixth PR process shown in Step S206, the black matrix is formed on the region that covers the island but not the color filters. Further, in a seventh PR process shown in Step S207, contact holes are provided to the source electrode portion and gate and drain terminal portions, respectively. Then, in an eighth PR process shown in Step S208, the pixel electrode is formed.

Also, FIGS. 13A through 13F, 14A through 14F, 15A through 15F, 16A through 16F, and 17A through 17F are plan views and cross sectional views showing major steps in the manufacturing method of the liquid crystal display device of the present embodiment. Here, FIGS. 13A, 14A, 15A, 16A, 17A and 11A are plan views each showing a region corresponding to one pixel on the active matrix substrate. FIGS. 13B, 14B, 15B, 16B, 17B, and 11B are plan views each showing the gate terminal portion. FIGS. 13C, 14C, 15C, 16C, 17C, and 11C are plan views each showing the drain terminal portion. FIGS. 13D, 14D, 15D, 16D, 17D, and 11D are cross sectional views each taken along the line AA'. FIGS. 13E, 14E, 15E, 16E, 17E, and 11E are cross sectional views each taken along the line BB'. FIGS. 13F, 14F, 15F, 16F, 17F, and 11F are cross sectional views each taken along the line CC'. The following description will describe the manufacturing method of the present embodiment step by step with reference to these drawings. Hereinafter, like components with respect to the first embodiment are labeled with like numerals.

First, as shown in FIGS. 13A through 13F, the Ti/Al film 102 made of a lamination of Al and Ti is formed on the transparent insulating substrate 101 made of glass or the like in a thickness of 0.1 to 0.3 μm by means of sputtering. The Ti/Al film 102 is made into a predetermined pattern in the first PR process by using a photoresist (not shown), whereby the gate electrode 210 and gate bus line 201 are formed. At this point, the gate terminal portion 251 is formed at the end of the gate bus line 201.

Subsequently, as shown in FIGS. 14A through 14F, the SiN film 103 is formed as the gate insulating film on the entire surface of the transparent insulating substrate 101 and Ti/Al film 102 in a thickness of 0.3 to 0.6 μm by means of plasma CVD. In succession, the intrinsic a-Si film 104 is formed on the SiN film 103 in a thickness of 0.05 to 0.3 μm, on which the n$^+$ type a-Si film 105 is formed in a thickness of 20 to 100 nm. Further, the Cr film 106 is formed on the n$^+$ type a-Si film 105 in a thickness of approximately 0.1 to 0.3 μm by means of sputtering. Then, in the second PR process, the Cr film 106, n$^+$ type a-Si film 105, and intrinsic a-Si film 104 are subjected to etching by means of half-tone exposure using a photoresist, which will be described below, whereby an island 220 made of a laminated structure of the intrinsic a-Si film 104 and n$^+$ type a-Si film 105, and the drain electrode 205 and source electrode 206 both made of the Cr film 106 are formed above the gate electrode 210. At the same time, the drain bus line 202 connected to the drain electrode 205 is formed. Here, at the end of the drain bus line 202, the drain terminal portion 261 is formed of the laminated structure of the intrinsic a-Si film 104, n$^+$ type a-Si film 105, and Cr film 106.

Figure 15A:
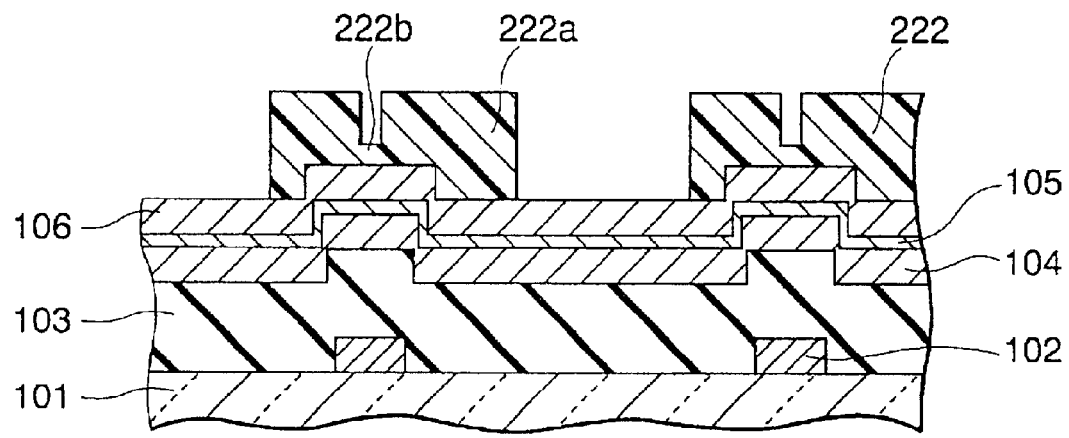
FIGS. 15A through 15C are cross sectional views showing a half-tone exposure method adapted in the second embodiment.
Figure 15B:
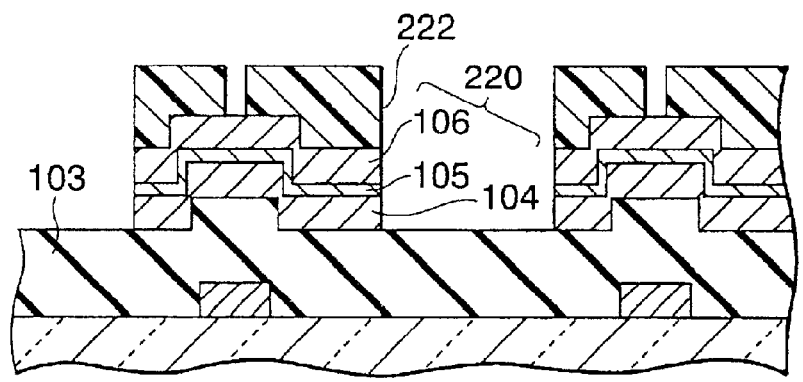
Figure 15C:
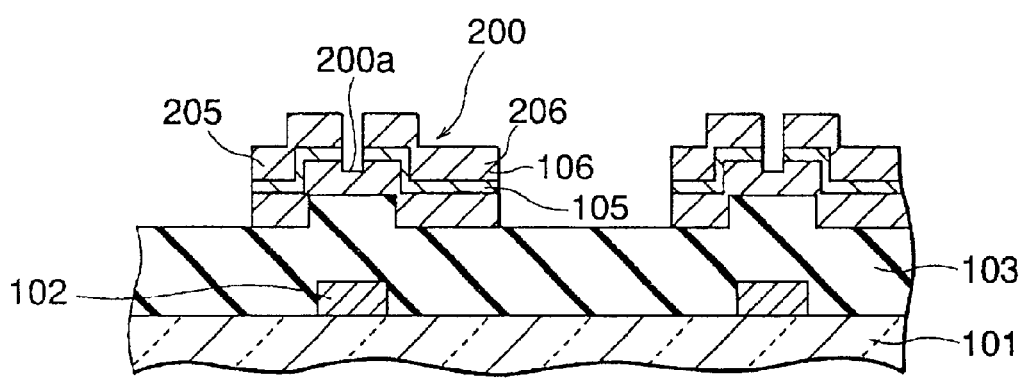
Figure 16A:
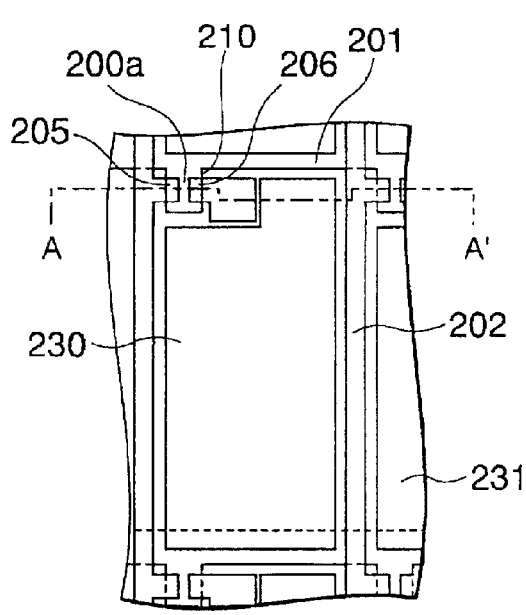
FIGS. 16A through 16F are plan views and cross sectional views showing a step following the step shown in FIGS. 14A through 14F in the manufacturing method of the color liquid crystal display device in accordance with the second embodiment.
Figure 16B:
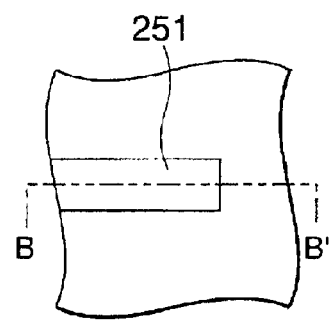
Figure 16C:
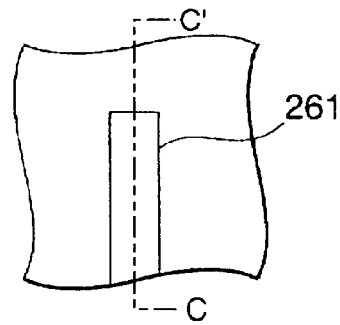
Figure 16D:
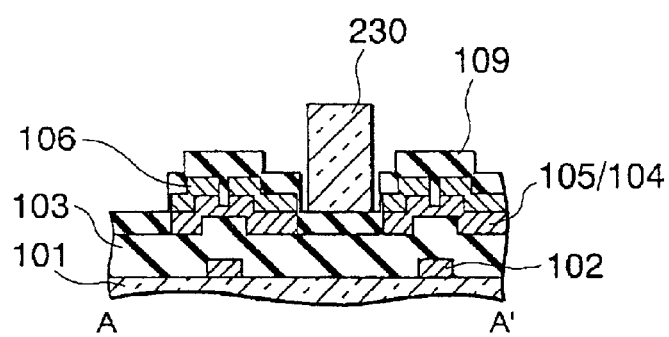
Figures 16E, 16F:
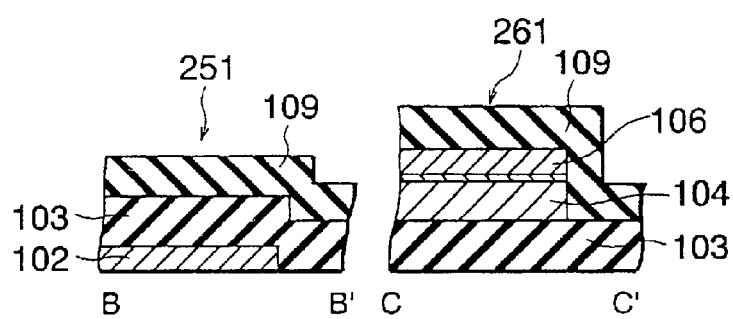
Figure 17A:
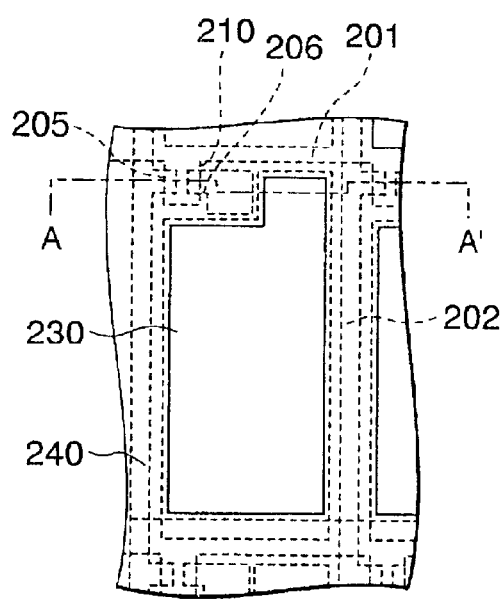
FIGS. 17A through 17F are plan views and cross sectional views showing a step following the step shown in FIGS. 16A through 16F in the manufacturing method of the color liquid crystal display device in accordance with the second embodiment.
Figure 17B:
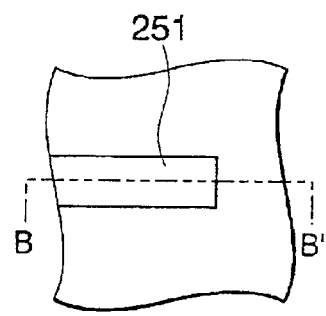
Figure 17C:
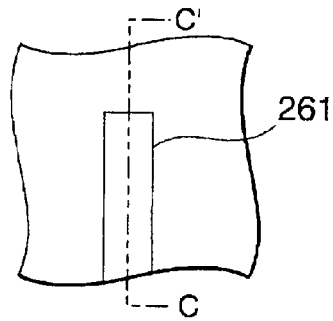
Figure 17D:
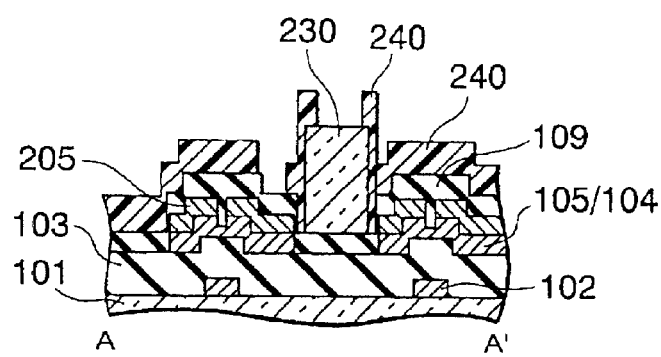
Figures 17E, 17F:
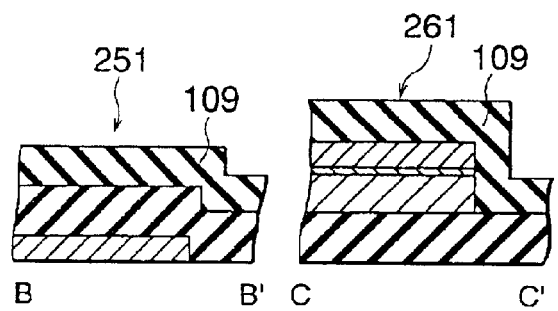

Next, the following description will describe the half-tone exposure. FIGS. 15A through 15C are cross sectional views showing the fabrication step of the island 220 by means of half-tone exposure step by step. A photomask (not shown) for use in exposing the photoresist 222 is formed to have a full mask portion that almost completely blocks light at a region corresponding to the drain bus line 202 (see FIG. 14A), and a half-tone portion at a region corresponding to a channel region 200a of the TFT 200 formed in the island 220. Although it is not shown in the drawings, the half-tone portion is provided with adequately spaced apart fine light blocking patterns at or below the resolution limit of an exposure device. Alternatively, the half-tone portion is made of materials having low light transmittance. Hence, when a positive photoresist is employed as the photoresist 222, the exposure with respect to the photoresist is performed with a slight amount of light at the half-tone portion. Accordingly, when the photoresist 222 is developed, the film thickness of the photoresist 222 is smaller at a region 222b corresponding to the half-tone portion than that at a region 222a corresponding to the full mask portion. Consequently, when the photoresist subjected to half-tone exposure using the above photomask is developed, it has a step-wise cross sectional view as shown in FIG. 15A, where both the region 222a exposed with the full mask portion and thereby having a thicker film thickness and the region 222b exposed with the half-tone portion and thereby having a thinner film thickness are present at the same time.

Then, the Cr film 106 is subjected to wet etching by using the photoresist 222 formed in the above manner, and the n$^+$ type a-Si film 105 and intrinsic a-Si film 104 are subjected to dry etching in succession, whereby, as shown in FIG. 15B, the island 220 and drain bus line 202 (see FIG. 14A) of the laminated structure are formed in a predetermined pattern.

Subsequently, the photoresist 222 is subjected to O$_2$ ashing so as to reduce its film thickness from the main surface side. Then, as shown in FIG. 15B, the photoresist 222 is removed completely at the region 222b with thinner film thickness for the half-tone portion corresponding to the channel region, whereby the Cr film 106 provided beneath is exposed. The film thickness of the region 222a with the thicker film thickness in the photoresist 222 is reduced by the ashing, but the photoresist 222 as the mask still remains on the Cr film 106. Then, the Cr film 106 is subjected to wet etching and dry etching by using the remaining photoresist 222, and further the n$^+$ type a-Si film 105 is subjected to dry etching, whereby, as shown in FIG. 15C, the drain electrode 205 and source electrode 206 both made of the Cr film 106, and the ohmic layer made of the n$^+$ type a-Si film 105 beneath these electrodes are formed, whereupon the TFT 200 is completed. In short, the TFT 200 and drain bus line 202 are formed in a single PR process.

Subsequently, as shown in FIGS. 16A through 16F, the protection insulating film (passivation film) 109 made of SiN$_x$ is formed on the entire surface in a thickness of 0.1 to 0.3 μm by means of plasma CVD. Then, like in the first embodiment, a film of red transparent resin is formed on the surface of the transparent insulating substrate 101 in a thickness of 0.8 μm, and made into a predetermined pattern in the third PR process, whereby the R color filter 230 is formed. In the same manner, a film of green transparent resin as thick as the R color filter 230 is formed and made into a predetermined pattern in the fourth PR process, whereby the G color filter 231 is formed. Further, a film of blue transparent resin as thick as the R color filter 230 and G color filter 231 is formed and made into a predetermined pattern in the fifth PR process, whereby the B color filter 232 is formed. The arrangement pattern of the respective RGB color filters 230 through 232 is as shown in FIG. 3.

Subsequently, as shown in FIGS. 17A through 17F, a film of light blocking black resin is formed, and patterned in the sixth PR process in such a manner as to cover regions other than the respective RGB color filters regions and the region above the source electrode 206 (see FIG. 15C), whereby the black matrix 240 is formed. The black matrix 240 may be formed before the color filters 230 through 232 are formed.

Subsequently, as shown in FIGS. 18A through 18F, a colorless transparent photosensitive acrylic resin is coated as the planarization film 107 over the entire surface in a thickness of 2.5 to 3.0 μm, and in the seventh PR process, the planarization film 107 and passivation film 109 are subjected to selective etching in succession, whereby the contact hole 221 is provided to expose the source electrode 206. At the same time, the planarization film 107, passivation film 109, and gate insulating film 103 are subjected to selective etching in succession at the gate terminal portion 251, whereby the gate terminal portion contact hole 252 is provided to expose the Ti/Al film 102 at the gate terminal portion 251. Also, at the drain terminal portion 261, the planarization film 107, and passivation film 109 are subjected to selective etching in succession, whereby the drain terminal portion contact hole 262 is provided to expose the Cr film 106 at the drain terminal portion 261. Alternatively, the planarization film 107 may be removed from these terminal regions.

Subsequently, as shown in FIGS. 11A through 11F, the ITO film 108 is formed as a transparent electrode film on the entire surface in a thickness of 30 to 100 nm by means of sputtering. Then, in the eighth PR process, the ITO film 108 is made into a predetermined pattern including the region over each of the color filters 230 through 232, whereby the pixel electrode 203 electrically connected to the source electrode 206 through the contact hole 221 is formed. At the same time, the gate terminal 250, electrically connected to the gate bus line 201, is formed of the ITO film 108 at the region including the gate terminal portion contact hole 252, while the drain terminal 260, electrically connected to the drain bus line 202, is formed of the ITO film 108 at the region including the drain terminal portion contact hole 262. Further, in order to facilitate the gap control during the cell fabrication step, a column may be formed of a colorless transparent photosensitive acrylic resin in a ninth PR process. Also, the above-described method employs the half-tone exposure in the second PR process. However, this process may be performed by double exposure that effects exposure in two stages with a different exposure amount in each instead. In this case, one step is added to the exposing step alone and one more mask is necessary, but the double exposure is advantageous over the half-tone exposure in that the processes can be controlled more readily.

Subsequently, although it is not shown in the drawings, after an orientation film is formed on the surface and the COT substrate is fabricated, a counter substrate provided with the common electrode, orientation film, etc. is placed to oppose the COT substrate and the two substrates are laminated into a unitary body with a microscopic space therebetween, after which the space between the COT substrate and counter substrate is filled with the liquid crystal and sealed, whereupon the color liquid crystal display device is completed. Also, the gate terminal and drain terminal are electrically connected to their respective driver circuits.

As has been discussed, according to the second embodiment of the present invention, it is also possible to manufacture a color active matrix substrate in the first through eighth PR processes. Consequently, compared with the conventional manufacturing method involving nine PR processes, one PR process can be omitted, thereby making it possible to provide a color liquid crystal display device at a low cost. Also, one more PR process can be omitted if the black matrix is formed by means of coloring using the pixel electrode as a mask, or by overlapping three colors of RGB as is in the conventional example.

In the present embodiment, like in the first embodiment, the D/I (Drain and Island) full plate etching is performed in the second PR process. Performing the D/I full plate etching in manufacturing the TFT substrate generally leaves a large step difference at the island portion, which raises a problem that it becomes difficult to control the orientation of the liquid crystal molecules particularly in the IPS (In Plane Switching) mode for driving the liquid crystal by a lateral electric field. Also, the coverage of the passivation film is deteriorated, which results in a problem that the materials forming the source and drain electrodes dissolve into the liquid crystal and readily induce unwanted smear on the display during the operation of the liquid crystal display device. In the present embodiment, however, because the step difference at the island portion is compensated with the passivation film 109, black matrix 240, and planarization film 107, it is possible to reduce the step difference, and therefore, suppress the occurrence of the foregoing problems. Consequently, the liquid crystal display device attains better orientation control and becomes more reliable.

Also, in the present embodiment, if the acrylic resin forming the black matrix is of a kind that would not pollute the a-Si film in the laminated structure when the a-Si film in the lamination structure and the black matrix are brought into contact with each other, the passivation film provided to prevent the pollution of the a-Si film can be omitted, thereby making it possible to reduce the number of steps besides those in the PR processes.

Further, with the liquid crystal display device of the second embodiment of the present invention, the black matrix is also formed to cover the peripheral portions of the respective RGB color filters. This makes it possible to clearly distinguish the boundary of the peripheral portion of each color filter by the black matrix, and therefore, is effective in displaying a sharp image.

Figure 19:
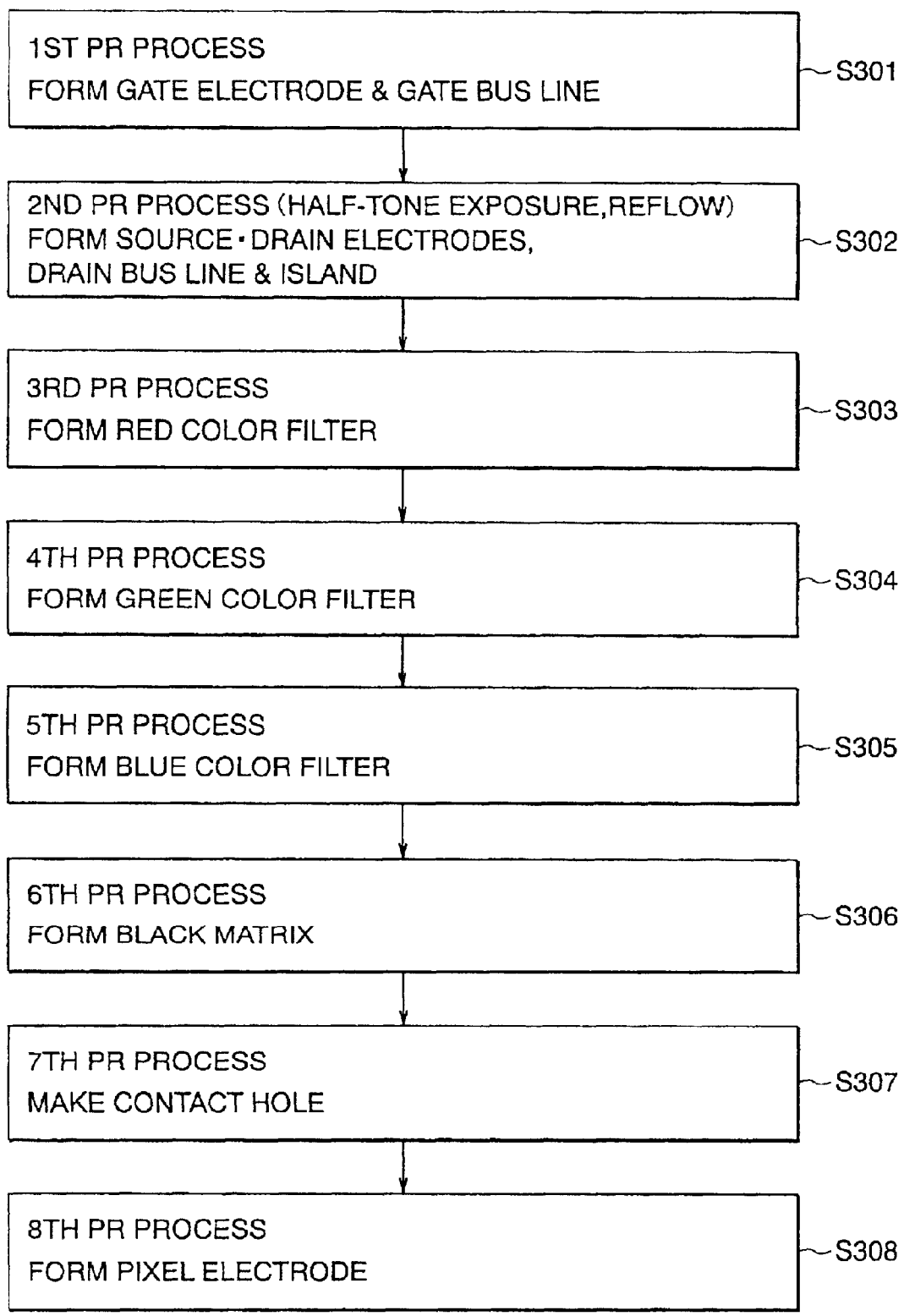
FIG. 19 is a flowchart showing a manufacturing method of a color liquid crystal display device in accordance with a third embodiment of the present invention.

The following description will describe a third embodiment of the present invention. A construction of a liquid crystal display device of the present embodiment is the same as the construction of the counterpart in the second embodiment. FIG. 19 is a flowchart showing the manufacturing method of the liquid crystal display device of the present embodiment. As shown in FIG. 19, like in the first and second embodiments, a COT substrate of the third embodiment is also fabricated in first through eighth PR processes. More specifically, in a first PR process shown in Step S301, the gate electrode and gate bus line are formed. In a second PR process shown in Step S302, the source electrode, drain electrode, and drain bus line are formed on the ohmic layer, after which an island is formed by means of half-tone exposure or double exposure and the reflow, which will be described below. In third through fifth PR processes respectively shown in Steps S303 through S305, the RGB color filters are formed in a pixel portion one by one. In a sixth PR process shown in Step S306, the black matrix is formed on the region covering the island but not the color filters. Further, in a seventh PR process shown in Step S307, contact holes are provided to the source electrode portion and the gate and drain terminal portions, respectively. Then, in an eighth PR process shown in Step S308, the pixel electrode is formed.

Like in the second embodiment, FIGS. 11A through 11F, 13A through 13F, 14A through 14F, 15A through 15F, 16A through 16F, 17A through 17F, and 18A through 18F are plan views and cross sectional views showing major steps in the manufacturing method of the liquid crystal display device of the third embodiment. The following description will describe the fabrication step in the manufacturing method of the present embodiment step by step with reference to these drawings and FIG. 19.

First, as shown in FIGS. 13A through 13F, a Ti/Al film 102 made of a lamination of Al and Ti is formed on a transparent insulating substrate 101 made of glass or the like in a thickness of 0.1 to 0.3 µm by means of sputtering. Then, the Ti/Al film 102 is made into a predetermined pattern in the first PR process using a photoresist (not shown), whereby a gate electrode 210 and a gate bus line 201 are formed. At this point, a gate terminal portion 251 is formed at the end of the gate bus line 201.

Subsequently, as shown in FIGS. 14A through 14F, an SiN film 103 is formed as the gate insulating film on the entire surface of the transparent insulating substrate 101 in a thickness of 0.3 to 0.6 µm by means of plasma CVD. In succession, an intrinsic a-Si film 104 is deposited on the SiN film 103 in a thickness of 0.05 to 0.3 µm, on which an $n^+$ type a-Si film 105 is deposited in a thickness of 20 to 100 nm. Further, a Cr film 106 is formed on the $n^+$ type a-Si film 105 in a thickness of approximately 0.1 to 0.3 µm by means of sputtering. Then, in the second PR process, the Cr film 106, n+ type a-Si film 105 and intrinsic a-Si film 104 are subjected to etching by means of half-tone exposure using a photoresist and reflow, which will be described below, whereby an island 220 made of a laminated structure of the n+ type a-Si film 105 and intrinsic a-Si film 104, and the drain electrode 205, source electrode 206, and drain bus line 202 connected to the drain electrode 205, all of which being made of the Cr film 106, are formed above the gate electrode 210. Here, at the end of the drain bus line 202, a drain terminal portion 261 is formed of the intrinsic a-Si film 104, n+ type a-Si film 105, and Cr film 106.

Figure 20A:
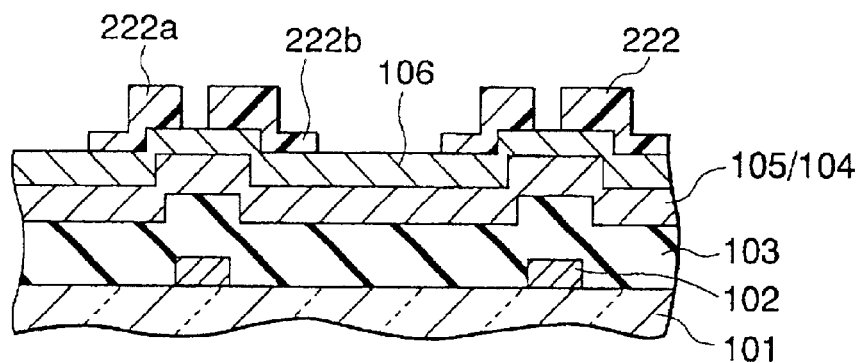
FIGS. 20A through 20D are cross sectional views showing a half-tone exposure method and a reflow method adapted in the third embodiment.

FIGS. 20A through 20D are cross sectional views showing the fabrication step of the island 220, drain electrode 205, and source electrode 206 by means of half-tone exposure and reflow. In a photomask (not shown) for use in exposing the photoresist 222, a region corresponding to the center of the island 220 except for a channel region 200a in the TFT 200 formed in the island 220 is formed as a full mask portion that almost completely blocks light. On the other hand, a region in the island 220 portion other than the full mask portion and a region corresponding to the drain bus line 202 in the photomask are formed as a half-tone portion. Although it is not shown in the drawings, the half-tone portion of the photomask is provided with adequately spaced apart fine light blocking patterns at or below the resolution limit of an exposure device. Alternatively, the half-tone portion is made of materials having low light transmittance. Hence, when a positive photoresist is employed as the photoresist 222, the exposure with respect to the photoresist 222 is performed with a slight amount of light at the half-tone portion. Accordingly, when the exposed photoresist 222 is developed, the film thickness of the photoresist 222 is smaller at a region 222b corresponding to the half-tone portion than that at a region 222a corresponding to the full mask portion. Consequently, when the photoresist 222 subjected to half-tone exposure using the above photomask is developed, it has a step-wise cross sectional view as shown in FIG. 20A, where both the region 222a exposed with the full mask portion and thereby having a thicker film thickness and the region 222b exposed with the half-tone portion and thereby having a thinner film thickness are present at the same time.

Figure 20B:
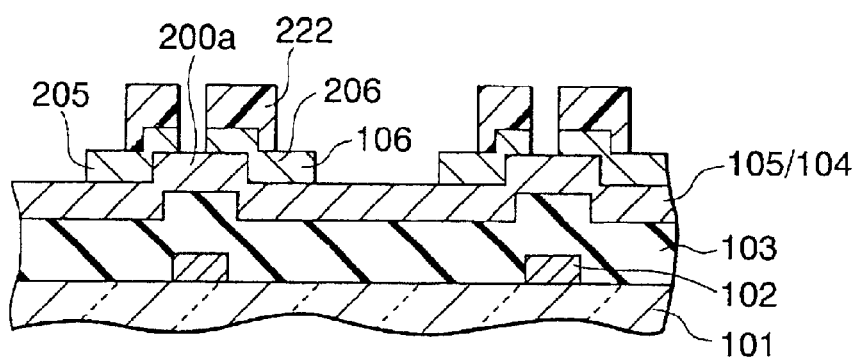
Figure 20C:
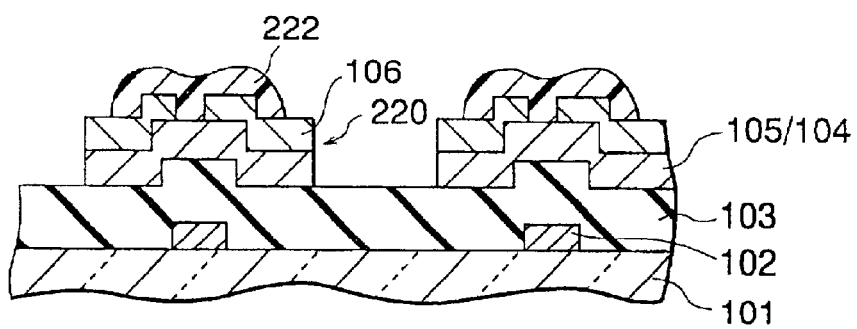

Then, the Cr film 106 is subjected to wet etching by using the photoresist 222 formed in the above manner, whereby, as shown in FIG. 20B, the drain electrode 205, source electrode 206, and drain bus line 202 all made of the Cr film 106 are formed into a predetermined pattern.

Subsequently, the photoresist 222 is subjected to $O_2$ ashing so as to reduce its film thickness from the main surface side, and then, as shown in FIG. 20B, the photoresist 222 is removed completely at the region 222b with the thinner film thickness corresponding to the half-tone portion, whereby the Cr film 106 provided beneath is exposed. The film thickness of the region 222a with the thicker film thickness in the photoresist 222 is reduced by the ashing, but the photoresist 222 still remains on the Cr film 106.

Figure 20D:
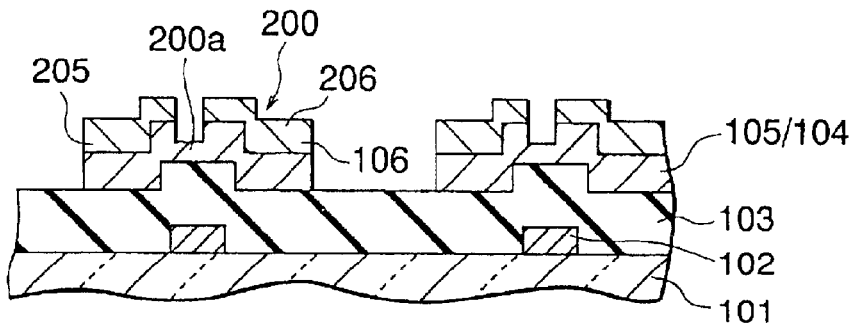

Then, by applying an organic solvent reflow method, with which the photoresist 222 is deformed by flowing into the same a vapor of an organic solvent, such as NMP (N-methyl-2-pyrrolidone), the remaining photoresist 222 is deformed to cover the channel region 200a as shown in FIG. 20B. Then, the island 220 is formed by subjecting the n+ type a-Si film 105 and intrinsic a-Si film 104 to dry etching by using both the photoresist 222 deformed in the above manner and the Cr film 106 as a mask remaining on the surface. Subsequently, the photoresist 222 is removed and the n+ type a-Si film 105 above the channel region 200a is removed by means of dry etching using the remaining Cr film 106 as a mask, whereby the ohmic layer made of the n+ type a-Si film 105 is formed beneath the drain electrode 205 and source electrode 206, whereupon the TFT 200 is completed as shown in FIG. 20D. In short, in addition to the TFT 200 and drain bus line 202 are formed in a single PR process, the etching involves a fewer steps compared with the second embodiment.

Subsequently, as shown in FIGS. 16A through 16F, a protection insulating film (passivation film) 109 made of $SiN_x$ is formed on the entire surface in a thickness of 0.1 to 0.3 μm by means of plasma CVD. Then, like in the first embodiment, a film of red transparent resin is formed on the surface of the transparent insulating substrate 101 in a thickness of 0.8 μm, and made into a predetermined pattern in the third PR process, whereby an R color filter 230 is formed. In the same manner, a film of green transparent resin as thick as the R color filter 230 is formed and made into a predetermined pattern in the fourth PR process, whereby a G color filter 231 is formed. Further, a film of blue transparent resin as thick as the R color filter 230 and G color filter 231 is formed and made into a predetermined pattern in the fifth PR process, whereby a B color filter 232 is formed. The arrangement pattern of the respective RGB color filters 230 through 232 is as shown in FIG. 3.

Subsequently, as shown in FIGS. 17A through 17F, a film of light blocking black resin is formed, and patterned in the sixth PR process in such a manner as to cover regions other than regions corresponding to regions over the respective RGB color filters 230 through 232 and a part of the region corresponding to a region over the source electrode 206 (see FIG. 20B), whereby a black matrix 240 is formed. The black matrix 240 may be formed before the color filters 230 through 232 are formed.

Subsequently, as shown in FIGS. 18A through 18F, a colorless transparent photosensitive acrylic resin as a planarization film 107 is coated over the entire surface in a thickness of 2.5 to 3.0 μm. Then, in the seventh PR process, the planarization film 107 and passivation film 109 are subjected to selective etching in succession, whereby a contact hole 221 is provided to expose the source electrode 206. At the same time, at the gate terminal portion 251, the planarization film 107, passivation film 109, and gate insulating film (SiN film 103) are subjected to selective etching in succession, whereby a gate terminal portion contact hole 252 is provided to expose the gate terminal portion 251. Also, at the drain terminal portion 261, the planarization film 107 and passivation film 109 are subjected to selective etching in succession, whereby a drain terminal portion contact hole 262 is provided to expose the drain terminal portion 261. Alternatively, the planarization film 107 may be removed from these terminal regions.

Subsequently, as shown in FIGS. 11A through 11F, an ITO film 108 is formed as a transparent electrode film on the entire surface in a thickness of 30 to 100 nm by means of sputtering, and in the eighth PR process, the ITO film 108 is made into a predetermined pattern including the region over the respective color filters 230 through 232, whereby a pixel electrode 203 electrically connected to the source electrode 206 through the contact hole 221 is formed. At the same time, a gate terminal 250, electrically connected to the gate bus line 201, is formed of the ITO film 108 at the region including the gate terminal portion contact hole 252, while a drain terminal 260, electrically connected to the drain bus line 202, is formed of the ITO film 108 at the region including the drain terminal portion contact hole 262. Further, in order to facilitate the gap control during the cell fabrication step, a column may be formed of a colorless transparent photosensitive acrylic resin in a ninth PR process (not shown). Also, the method employing the half-tone exposure in the second PR process was explained in the present embodiment. However, the present invention may employ a method of performing double exposure that effects exposure in two stages with a different exposure amount in each in the second PR process.

Subsequently, although it is not shown in the drawings, an orientation film is formed on the surface, whereupon a COT substrate is fabricated. Then, a counter substrate provided with the common electrode, orientation film, etc. is placed to oppose the COT substrate and the two substrates are laminated into a unitary body with a microscopic space therebetween, after which the space between the COT substrate and counter substrate is filled with the liquid crystal and sealed, whereupon a color liquid crystal display device is completed. Also, the gate terminal 250 and drain terminal 260 are electrically connected to their respective driver circuits.

In the present embodiment, like in the second embodiment, the D/I (Drain and Island) full plate etching is performed in the second PR process. Performing the D/I full plate etching in manufacturing the TFT substrate generally leaves a large step difference at the island portion. This raises a problem that it becomes difficult to control the orientation of the liquid crystal molecules particularly in the IPS (In Plane Switching) mode for driving the liquid crystal by a lateral electric field. Also, the coverage of the passivation film is deteriorated, which results in a problem that the materials forming the source and drain electrodes dissolve into the liquid crystal and readily induce unwanted smear on the display during the operation of the liquid crystal display device. In the present embodiment, however, because the step difference at the island portion is compensated with the passivation film 109, black matrix 240, and planarization film 107, it is possible to reduce the step difference, and therefore, suppress the occurrence of the foregoing problems. Consequently, the liquid crystal display device attains better orientation control and becomes more reliable.

Also, in the present embodiment, like in the second embodiment, if the acrylic resin forming the black matrix is of a kind that would not pollute the a-Si film in the lamination structure when the a-Si film in the lamination structure and the black matrix are brought into contact with each other, the passivation film provided to prevent the pollution of the a-Si film can be omitted.

As has been discussed, according to the third embodiment of the present invention, it is also possible to manufacture a color active matrix substrate in the first through eighth PR processes. Consequently, compared with the conventional manufacturing method involving nine PR processes, one PR process can be omitted, thereby making it possible to provide a color liquid crystal display device at a low cost. Also, with the liquid crystal display device of the third embodiment of the present invention, the black matrix is formed to cover the peripheral portions of the respective RGB color filters. This makes it possible to clearly distinguish the boundary of the peripheral portion of each color filter by the black matrix, thereby making it possible to display a sharp image.

Each of the above embodiments explained the method of forming the color filters and black matrix by means of photolithography, but the color filters and black matrix may be formed by means of printing. Also, one more PR process can be omitted if the black matrix is formed by means of coloring using the pixel electrode as a mask, or by overlapping three colors of RGB as is in the conventional example. Alternatively, the black matrix may be formed by means of photolithography or printing first, and thence the color filters may be formed by the ink jet method. In this case, according to a popular method, a bank material made of a water repellent transparent resin is deposited on the black matrix, and the black matrix of approximately 4-μm thick and bank material are patterned simultaneously or in succession. If these techniques are adapted, three or four more PR processes can be omitted, thereby achieving further cost reduction.

Each of the above-described embodiments explained an example case where the gate electrode and gate bus line are formed of the Ti/Al film and the source and drain electrodes and drain bus line are formed of the Cr film. However, the present invention is not limited to the foregoing, and the former may be formed of a triple-layer film, such as a Ti/Al/Ti film, or a single-layer film, such as a Cr film, and the latter may be formed of a triple-layer film, such as a Ti/Al/Ti film.

What is claimed is:

1. A color liquid crystal display device comprising a color active matrix substrate, the color active matrix substrate having a transparent insulating substrate and a thin film transistor, a color filter, a black matrix, and a pixel electrode which are provided on said transparent insulating substrate, said thin film transistor having an inverted staggered structure in which a gate electrode, a gate insulating film, a semiconductor layer, an ohmic layer, and a pair of source and drain electrodes are deposited sequentially, and said ohmic layer, source and drain electrodes, and black matrix being of a same shape above a channel region formed in said semiconductor layer when seen in a deposit direction.

2. A color liquid crystal display device comprising a color active matrix substrate having a transparent insulating substrate and a thin film transistors, a color filter, a black matrix, and a pixel electrode which are provided on said transparent insulating substrate, said thin film transistor having an inverted staggered structure in which a gate electrode, a gate insulating film, a semiconductor layer, an ohmic layer, and a pair of source and drain electrodes are deposited sequentially, and said ohmic layer and source and drain electrodes being of a same shape when seen in a deposit direction.

3. The color liquid crystal display device according to claim 1, comprising a drain bus line connected to said drain electrode and having a laminated structure of metal films same as metal films respectively forming said semiconductor layer, ohmic layer, and source and drain electrodes.

4. The color liquid crystal display device according to claim 1, wherein said black matrix is formed in such a manner as to cover at least a part of a peripheral portion of said color filter.

* * * * *